(12) United States Patent
Picard et al.

(10) Patent No.: US 12,466,839 B2
(45) Date of Patent: Nov. 11, 2025

(54) ALLOSTERIC AKT INHIBITORS FOR USE IN THE TREATMENT OF HEREDITARY HEMORRHAGIC TELANGIECTASIA

(71) Applicant: VADERIS THERAPEUTICS AG, Basel (CH)

(72) Inventors: Damien Picard, Basel (CH); Pierre Saint-Mezard, Basel (CH)

(73) Assignee: Vaderis Therapeutics AG, Basel (CH)

( * ) Notice: Subject to any disclaimer, the term of this patent is extended or adjusted under 35 U.S.C. 154(b) by 463 days.

(21) Appl. No.: 18/247,261

(22) PCT Filed: Sep. 29, 2021

(86) PCT No.: PCT/EP2021/076811
§ 371 (c)(1),
(2) Date: Mar. 29, 2023

(87) PCT Pub. No.: WO2022/069552
PCT Pub. Date: Apr. 7, 2022

(65) Prior Publication Data
US 2024/0092801 A1    Mar. 21, 2024

(30) Foreign Application Priority Data
Sep. 30, 2020 (GB) ..................... 2015536

(51) Int. Cl.
*C07D 498/04* (2006.01)
*A61K 31/536* (2006.01)
*A61P 9/00* (2006.01)

(52) U.S. Cl.
CPC .............. *C07D 498/04* (2013.01); *A61P 9/00* (2018.01); *A61K 31/536* (2013.01)

(58) Field of Classification Search
CPC ................. A61K 31/536; A61P 9/00
See application file for complete search history.

(56) References Cited

U.S. PATENT DOCUMENTS

| | | | |
|---|---|---|---|
| 9,221,838 B2 | 12/2015 | Zhang et al. | |
| 2008/0207666 A1 | 8/2008 | Debenham et al. | |
| 2013/0116243 A1 | 5/2013 | Zhang et al. | |

FOREIGN PATENT DOCUMENTS

| | | |
|---|---|---|
| CN | 102791708 A | 11/2012 |
| EP | 2116237 A1 | 11/2009 |
| WO | WO-2005082856 A2 | 9/2005 |
| WO | WO-2006065601 A2 | 6/2006 |
| WO | WO-2006135627 A2 | 12/2006 |
| WO | WO-2008011032 A1 | 1/2008 |
| WO | WO-2008070016 A2 | 6/2008 |
| WO | WO-2008070041 A2 | 6/2008 |
| WO | WO-2008070134 A1 | 6/2008 |
| WO | WO-2009148887 A1 | 12/2009 |
| WO | WO-2009148916 A1 | 12/2009 |
| WO | WO-2010091808 A1 | 8/2010 |
| WO | WO-2011077098 A1 | 6/2011 |
| WO | WO-2012136776 A1 | 10/2012 |
| WO | WO-2016187157 A1 | 11/2016 |
| WO | WO-2019051063 A1 | 3/2019 |
| WO | WO-2022069552 A1 | 4/2022 |

OTHER PUBLICATIONS

Combined Search and Examination Report received for GB Application No. GB2015536.2, dated Feb. 25, 2021. 5 pages.
Office Action and Search Report for Chile Application No. 2023-00926 mailed Oct. 17, 2024, with English translation of relevant parts of Office Action, 15 pages.
Office Action for Eurasian Application No. EA202390592 mailed Sep. 13, 2024, 8 pages with English translation.
Office Action for Eurasian Patent Application No. EA202390592 mailed Feb. 28, 2024, with English translation, 6 pages.
Office Action for European Application No. EP21789616.6 dated Jun. 24, 2024, 6 pages.
Ruiz et al., "Correcting Smad1/5/8, mTOR, and VEGFR2 treats pathology in hereditary hemorrhagic telangiectasia models." J Clin Invest. Feb. 3, 2020; 130(2):942-957. doi: 10.1172/JCI127425.
Alsina-Sanchis et al., "ALK1 Loss Results in Vascular Hyperplasia in Mice and Humans Through PI3K Activation", Arterioscler Thromb Vasc Biol, May 2018; 38(5): 1216-1229. Epub Feb. 15, 2018.
Castel, P., et al., "Somatic PIK3CA mutations as a driver of sporadic venous malformations", Sci Transl Med, Mar. 3, 20160; 8(332): 332ra42, 11 pages.
Castillo et al., "Phosphoinositide 3-kinase: a new kid on the block in vascular anomalies", Pathol, Dec. 2016; 240(4): 387-396. Epub Oct. 20, 2016.
Dawson, T H, "Allometric relations and scaling laws for the cardiovascular system of mammals", Systems, Jun. 2014; 2(2): 168-85.
Dumble et al., "Discovery of novel AKT inhibitors with enhanced anti-tumor effects in combination with the MEK inhibitor", PLoS One, Jun. 3, 20140; 9(6): e100880. eCollection 2014, 11 pages.
Dupuis-Girod et al., "Hereditary hemorrhagic telangiectasia: From molecular biology to patient care", J Thromb Haemost, Jul. 2010; 8(7): 1447-56. Epub Mar. 19, 2010.

(Continued)

*Primary Examiner* — Kevin E Weddington
(74) *Attorney, Agent, or Firm* — COOLEY LLP

(57) ABSTRACT

The present invention provides compounds of formula (I) or pharmaceutically acceptable salts thereof, for use in the treatment of Hereditary Hemorrhagic Telangiectasia (HHT).

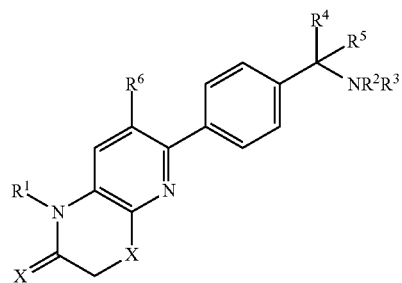

36 Claims, 21 Drawing Sheets

(56) References Cited

OTHER PUBLICATIONS

Galaris et al., "In vitro Three-Dimensional Sprouting Assay of Angiogenesis using Mouse Embryonic Stem Cells for Vascular Disease Modeling and Drug Testing", J Vis Exp, May 11, 2021; (171) e62554, 18 pages.

Galaris et al., "Pericytes in Hereditary Hemorrhagic Telangiectasia", Adv Exp Med Biol, 2019; 1147: 215-246.

Gkatzis et al., "Interaction Between ALK1 Signaling and Connexin40 in the Development of Arteriovenous Malformations", Arterioscler Thromb Vasc Biol, Apr. 2016; 36(4): 707-17. Epub Jan. 28, 2016.

Golub, T.R, et al., "Molecular classification of cancer: class discovery and class prediction by gene expression monitoring", Science, Oct. 15, 1999; 286(5439): 531-7.

Gossage J., et al., "11th International HHT Scientific Conference ED—Nowak-Siiwinska Patrycja; Griffioen Arjan W", Angiogenesis, Kluwer, Dordrecht, Nl, vol. 18, No. 4, Sep. 16, 2015 (Sep. 16, 2015), pp. 525-575.

Gradziel et al., "Cytotoxic amphiphiles and phosphoinositides bind to two discrete sites on the Akt1 PH domain", Biochemistry, Jan. 28, 2014; 53(3): 462-72. Epub Jan. 10, 2014.

International Preliminary Report on Patentability for International Application No. PCT/EP2021/076811 dated Apr. 13, 2023, 9 pages.

International Search Report & Written Opinion for International Application No. PCT/EP2021/076811, mailed Dec. 20, 2021, 16 pages.

International Search Report & Written Opinion for International Application No. PCT/GB2010/002329, dated Mar. 11, 2011, 9 pages.

Iriarte et al., "PI3K (Phosphatidylinositol 3-Kinase) Activation and Endothelial Cell Proliferation in Patients with Hemorrhagic Hereditary Telangiectasia Type 1", Cells, Aug. 24, 2019; 8(9): 971.

Jin et al., "Endoglin prevents vascular malformation by regulating flow-induced cell migration and specification through VEGFR2 signalling", Nat Cell Biol, Jun. 2017; 19(6): 639-652. Epub May 22, 2017.

Kondapaka et al., "Perifosine, a novel alkylphospholipid, inhibits protein kinase B activation", Mol Cancer Ther, Nov. 2003; 2(11): 1093-103.

Kostaras et al., "A systematic molecular and pharmacologic evaluation of AKT inhibitors reveals new insight into their biological activity", Br J Cancer, Aug. 2020; 123(4): 542-555. Epub May 22, 2020.

Le Cras et al., "Constitutively active PIK3CA mutations are expressed by lymphatic and vascular endothelial cells in capillary lymphatic venous malformation", Angiogenesis, Aug. 2020; 23(3): 425-442. Epub Apr. 30, 2020.

Lebrin et al., "Thalidomide stimulates vessel maturation and reduces epistaxis in individuals with hereditary hemorrhagic telangiectasia", Nat Med, Apr. 2010; 16(4): 420-8. Epub Apr. 4, 2010.

Lee et al., "Endothelial Akt1 mediates angiogenesis by phosphorylating multiple angiogenic substrates", Proc Natl Acad Sci USA, Sep. 2, 2014;111(35): 12865-70. Epub Aug. 18, 2014.

Mahmoud et al., "Pathogenesis of arteriovenous malformations in the absence of endoglin", Circ Res, Apr. 30, 2010; 106(8): 1425-33. Epub Mar. 11, 2010.

Ola et al., "PI3 kinase inhibition improves vascular malformations in mouse models of hereditary haemorrhagic telangiectasia", Nat Commun, Nov. 26, 2016; 7: 13650, 12 pages.

Ola R,. et al., "SMAD4 Prevents Flow Induced Arteriovenous Malformations by Inhibiting Casein Kinase 2", Circulation, vol. 138, No. 21, Nov. 20, 2018 (Nov. 20, 2018), pp. 2379-2394.

Pachl et al., "Characterization of a chemical affinity probe targeting Akt kinases", J Proteome Res, Aug. 2, 2013; 12(8): 3792-800. Epub Jul. 3, 2013.

Perry et al., "AKT1 overexpression in endothelial cells leads to the development of cutaneous vascular malformations in vivo", Arch Dermatol, Apr. 2007; 143(4): 504-6.

Phung et al., "Pathological angiogenesis is induced by sustained Akt signaling and inhibited by rapamycin", Cancer Cell, Aug. 2006; 10(2): 159-70.

Rios-Marco et al., "Alkylphospholipids : An update on molecular mechanisms and clinical relevance", Biochim Biophys Acta Biomembr, Sep. 2017; 1859(9 Pt B): 1657-1667. Epub Feb. 24, 2017.

Rodon et al., "Development of PI3K inhibitors: Lessons learned from early clinical trials", Nat Rev Clin Oncol, Mar. 2013; 10(3): 143-53. Epub Feb. 12, 2013.

Ruiz et al., "Sirolimus plus nintedanib treats vascular pathology in HHT mouse models", bioRxiv. Aug. 18, 2019: 739144, 47 pages.

Shi et al., "Rho-kinase in development and heart failure: Insights from genetic models", Pediatr Cardiol, Mar. 2011; 32(3): 297-304. Epub Feb. 16, 2011.

Thalgott et al., "Decreased Expression of Vascular Endothelial Growth Factor Receptor 1 Contributes to the Pathogenesis of Hereditary Hemorrhagic Telangiectasia Type 2", Circulation, Dec. 4, 2018; 138(23): 2698-2712.

Wu Z et al: "Rapid assembly of diverse and potent allosteric Akt inhibitors", Bioogranic & Medicinal Chemistry Letters, Pergamon, Elseuier Science, GB, vol. 18, No. 6, Mar. 15, 2008 (Mar. 15, 2008), pp. 2211-2214.

Canaud et al., "Assessment of therapeutic efficacy of VAD044 in venous and lymphatic malformations mice models." Study Final Report, Vaderis Therapeutics, Switzerland, Aug. 22, 2021, 19 pages.

Miransertib, (ARG-092), AKT Inhibitor, MedChemExpress, Product data sheet, available at: https://file.medchemexpress.com/batch_PDF/HY-19719/Miransertib-DataSheet-MedChemExpress.pdf, publication date unknown, retrieved Sep. 9, 2025, 3 pages.

Office Action and Search Report for Chile Application No. 202300926 mailed Apr. 25, 2025, with English translation of Office Action, 18 pages.

Office Action and Search Report for Chinese Application No. 202180066598.2 mailed Feb. 28, 2025, with English translation, 15 pages.

Second Office Action for Chinese Application No. 202180066598.2 mailed May 27, 2025, with English translation, 13 pages.

Zerbib, L., et al., "Targeted therapy for capillary-venous malformations." Signal Transduct Target Ther. Jun. 17, 2024;9(1): 146. doi: 10.1038/s41392-024-01862-9. 16 pages.

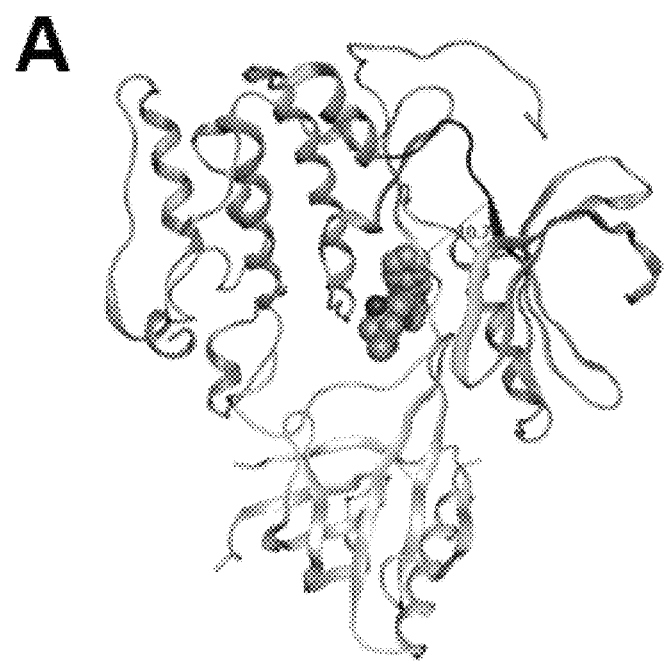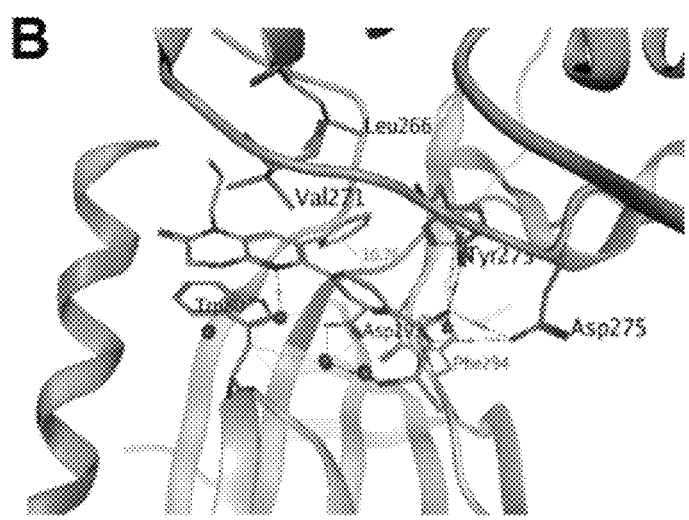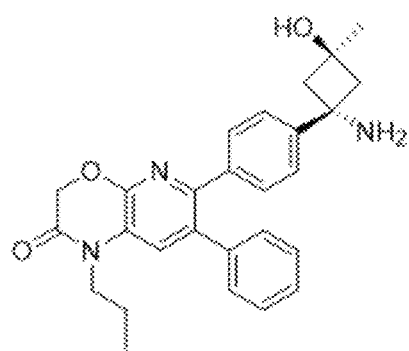
FIGURES 1A & 1B

A-

B-

ALLOSTERIC AKT INHIBITORS FOR USE IN THE TREATMENT OF HEREDITARY HEMORRHAGIC TELANGIECTASIA

FIELD OF THE INVENTION

The invention relates to allosteric AKT inhibitors and their use in the treatment of Hereditary Hemorrhagic Telangiectasia (HHT).

BACKGROUND

Hereditary Hemorrhagic Telangiectasia (HHT) is an autosomal dominant genetic disease that affects one in 5,000-8,000 people worldwide. Clinical symptoms include pulmonary, cerebral and hepatic arteriovenous malformations (AVMs) that consist of direct connections between arteries and veins without intervening blood capillaries. AVMs can cause life-threatening complications if not treated. HHT patients also develop small arteriovenous malformations named telangiectases in the nose, mouth and gastrointestinal tract. These fragile vessels rupture and hemorrhage easily, causing recurrent anemia after severe and frequent bleeding episodes (Dupuis-Girod et al., (2010), "Hereditary hemorrhagic telangiectasia: From molecular biology to patient care", Journal of Thrombosis and Haemostasis. https://doi.org/10.1111/j.1538-7836.2010.03860.x; Iriarte et al., (2019), "PI3K (Phosphatidylinositol 3-Kinase) Activation and Endothelial Cell Proliferation in Patients with Hemorrhagic Hereditary Telangiectasia Type 1", Cells. https://doi.org/10.3390/cells8090971).

The majority of mutations identified to date are found in two genes. HHT1 is caused by mutations in the ENG (endoglin) gene whereas HHT2 is caused by mutations in ACVRL1 (Activin receptor-like kinase 1, ALK1). Both are receptors for Transforming Growth Factor-β (TGF-β)/Bone Morphogenetic Protein (BMP) expressed primarily in endothelial cells. Mutations represent null alleles indicating that haploinsufficiency is the underlying cause of HHT. How mutations in ENG or ACVRL1 (ALK1) lead to pathological angiogenesis remain poorly understood.

Identification of the causative gene mutations and the generation of animal models have revealed that decreased transforming growth factor-β (TGF-β)/bone morphogenetic protein (BMP) signaling and increased vascular endothelial growth factor (VEGF) signaling activity in endothelial cells are responsible for the development of the vascular malformations in HHT. Perturbations in these key pathways lead to endothelial cell activation resulting in mural cell disengagement from the endothelium (Galaris et al., (2019), "Pericytes in Hereditary Hemorrhagic Telangiectasia", Advances in Experimental Medicine and Biology. https://doi.org/10.1007/978-3-030-16908-4_10). This initial instability state causes the blood vessels to respond inadequately when they are exposed to angiogenic triggers, resulting in excessive blood vessel growth and the formation of vascular abnormalities that are prone to bleeding.

Recently, a series of studies from mouse models and in vitro experiments has revealed a link between the PI3K/AKT signaling pathway and the increased endothelial cell activation observed in HHT. Loss of ALK1 signaling coincides with increased PI3K/AKT signaling induced by reduced PTEN in endothelial cells (Jin et al., (2017), "Endoglin prevents vascular malformation by regulating flow-induced cell migration and specification through VEGFR2 signalling", Nature Cell Biology, 19(6), 639-652. https://doi.org/10.1038/ncb3534; Ola et al., (2016), "PI3 kinase inhibition improves vascular malformations in mouse models of hereditary haemorrhagic telangiectasia", Nature Communications, 7. https://doi.org/10.1038/ncomms13650; Ola et al. (2018), "SMAD4 Prevents Flow Induced Arteriovenous Malformations by Inhibiting Casein Kinase 2", Circulation, 138(21), 2379-2394). This observation is confirmed in cutaneous telangiectasia biopsies of HHT1 and HHT2 patients, in which the increased endothelial cell proliferation is linked to an increase on the PI3K/AKT pathway downstream genes (Alsina-Sanchis et al., (2018), "ALK1 loss results in vascular hyperplasia in mice and humans through PI3K activation", Arteriosclerosis, Thrombosis, and Vascular Biology. https://doi.org/10.1161/ATVBAHA.118.310760).

Targeting the Pi3K/AKT/mTOR signaling may provide a therapeutic strategy for the treatment of pathological angiogenesis observed in HHT. However, safe and effective treatment agents are as-yet unknown. For instance, Wortmannin, a widely-used pan Pi3K inhibitor, is able to inhibit AVM formation in the retinal mouse model of ALK1 or SMAD4 iKO (Ola et al., (2016), (2018), as above) but not in the Endoglin-inducible knockout (Eng-iKO) model (Jin et al., (2017), as above). Similarly, sirolimus, a typical mTOR inhibitor, is not able to block AVM formation in the Eng-iKO model (Ruiz et al., (2019), "Sirolimus plus nintedanib treats vascular pathology in HHT mouse models", BioRxiv Cell Biology. https://doi.org/10.1101/739144).

There is therefore a need to provide agents for the treatment of HHT, which are effective and have an acceptable safety profile.

SUMMARY OF INVENTION

In accordance with a first aspect of the invention, there is provided a compound of formula (I):

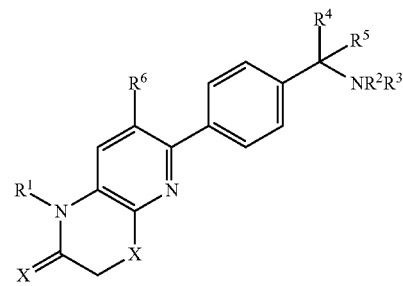

or a pharmaceutically acceptable salt thereof, for use in the treatment of Hereditary Hemorrhagic Telangiectasia (HHT) in a subject, wherein:

each X is independently O or S;

$R^1$ is selected from hydrogen and $C_1$-$C_{10}$ alkyl, wherein each $C_1$-$C_{10}$ alkyl is optionally substituted with one or more substituents selected from halogen, —CN, —OW or 3-6 membered cycloalkyl;

$R^2$ and $R^3$ are each independently selected from hydrogen and $C_1$-$C_{10}$ alkyl; or $R^2$ and $R^3$, together with the nitrogen atom to which they are attached, form a 3-6 membered heterocyclic ring;

$R^4$ and $R^5$ are each independently selected from $C_1$-$C_6$ alkyl, $C_2$-$C_6$ alkenyl, or $C_2$-$C_6$ alkynyl; or $R^4$ and $R^5$, together with the carbon atom to which they are attached, form a 3-6 membered cycloalkyl or heterocyclic ring which is optionally substituted with one or more substituents selected from $C_1$-$C_{10}$ alkyl, —CN, —OW, halogen, —COR$^7$, CO$_2$R$^7$, CONR$^7_2$ and —NR$^7_2$;

R$^6$ is a 5-7 membered aryl or heteroaryl ring which is optionally substituted with one or more substituents selected from $C_1$-$C_{10}$ alkyl, —CN, —OW, halogen, —COR$^7$, CO$_2$R$^7$, CONR$^7_2$ and —NR$^7_2$; and each R$^7$ is independently selected from hydrogen and $C_1$-$C_{10}$ alkyl.

In some embodiments, the compound of formula (I) has the structure:

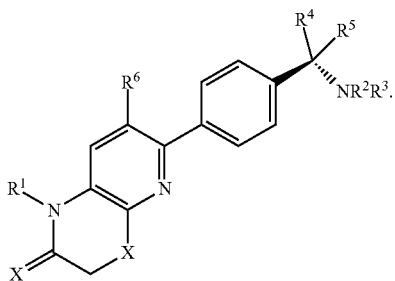

In some embodiments, R$^6$ is phenyl substituted with one or more substituents selected from $C_1$-$C_{10}$ alkyl, —CN, —OW, halogen, —COR$^7$, CO$_2$R$^7$, CONR$^7_2$ and —NR$^7_2$. In some embodiments, the one or more substituents are selected from $C_1$-$C_6$ alkyl, —CN, —OH and halogen. In other embodiments, R$^6$ is unsubstituted phenyl.

In some embodiments, R$^6$ is a 5-7 membered heteroaryl ring which is substituted with one or more substituents selected from $C_1$-$C_{10}$ alkyl, —CN, —OW, halogen, —COR$^7$, CO$_2$R$^7$, CONR$^7_2$ and —NR$^7_2$. In some embodiments, the one or more substituents are selected from $C_1$-$C_6$ alkyl, —CN, —OH and halogen. In other embodiments, R$^6$ is an unsubstituted 5-7 membered heteroaryl ring. In certain embodiments, the heteroaryl ring is a 6-membered heteroaryl ring. In some embodiments, the heteroaryl ring contains at least one nitrogen atom. In some embodiments, the heteroaryl ring contains at least one oxygen atom. In some embodiments, the heteroaryl ring contains at least one sulfur atom. For example, the heteroaryl ring may be pyridine, pyran, thiopyran, pyrrole, furan or thiophene.

In some embodiments R$^4$ and R$^5$, together with the carbon atom to which they are attached, form a 3-6 membered unsubstituted cycloalkyl or heterocyclic ring. In other embodiments R$^4$ and R$^5$, together with the carbon atom to which they are attached, form a 3-6 membered unsubstituted cycloalkyl or heterocyclic ring which is substituted with one or more substituents selected from $C_1$-$C_{10}$ alkyl, —CN, —OW, halogen, —COR$^7$, CO$_2$R$^7$, CONR$^7_2$ and —NR$^7_2$. For example, the cycloalkyl ring may be a cyclopropyl ring, a cyclobutyl ring, a cyclopentyl ring, or a cyclohexyl ring. In some embodiments the heterocyclic ring contains at least one nitrogen atom. In some embodiments, the heterocyclic ring contains at least one oxygen atom. In some embodiments, the heterocyclic ring contains at least one sulfur atom. For example, the heterocyclic ring may be piperidine, tetrahydropyran, thiane, pyrrolidine, tetrahydrofuran, or tetrahydrothiophene.

In some embodiments R$^4$ and R$^5$, together with the carbon atom to which they are attached, form an unsubstituted cyclopropyl, cyclobutyl, cyclopentyl, or cyclohexyl ring. In other embodiments, the cyclopropyl, cyclobutyl, cyclopentyl, or cyclohexyl ring is substituted with one or more substituents selected from $C_1$-$C_{10}$ alkyl, —CN, —OW, halogen, —COR$^7$, CO$_2$R$^7$, CONR$^7_2$ and —NR$^7_2$. In some embodiments, the one or more substituents are selected from $C_1$-$C_6$ alkyl, —CN, —OH and halogen. In some embodiments R$^4$ and R$^5$, together with the carbon atom to which they are attached, form an unsubstituted cyclobutyl ring. In other embodiments, the cyclobutyl ring is substituted with one or more substituents selected from $C_1$-$C_{10}$ alkyl, —CN, —OW, halogen, —COR$^7$, CO$_2$R$^7$, CONR$^7_2$ and —NR$^7_2$. In some embodiments, the one or more substituents is selected from $C_1$-$C_6$ alkyl, —CN, —OH and halogen.

In some embodiments, each X is O.

In some embodiments, R$^1$ is unsubstituted $C_1$-$C_{10}$ alkyl, unsubstituted $C_1$-$C_6$ alkyl, or unsubstituted $C_1$-$C_4$ alkyl. In some embodiments, R$^1$ is methyl, ethyl, propyl, butyl, pentyl or hexyl. In some embodiments, R$^1$ is methyl, ethyl, n-propyl, i-propyl, n-butyl, i-butyl, or t-butyl. In some embodiments, R$^1$ is methyl or ethyl.

In some embodiments, R$^1$ is $C_1$-$C_{10}$ alkyl, $C_1$-$C_6$ alkyl, or $C_1$-$C_4$ alkyl, substituted with one or more substituents selected from halogen, —CN, —OH or 3-6 membered cycloalkyl. In some embodiments, R$^1$ is —(CH$_2$)$_n$CN, wherein n is 1, 2, 3, 4 or 5.

In some embodiments, R$^2$ and R$^3$ are each independently selected from hydrogen and $C_1$-$C_{10}$ alkyl. In some embodiments, R$^2$ and R$^3$ are each independently selected from hydrogen and $C_1$-$C_6$ alkyl. In some embodiments, R$^2$ and R$^3$ are each independently selected from hydrogen, methyl and ethyl. In some embodiments, R$^2$ and R$^3$ are each hydrogen.

In some embodiments, the compound of formula (I) is:

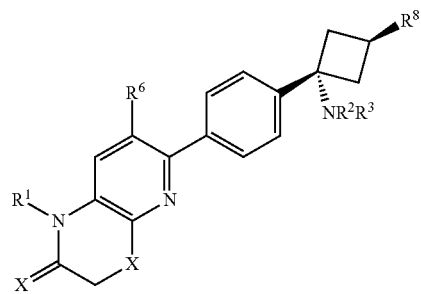

or

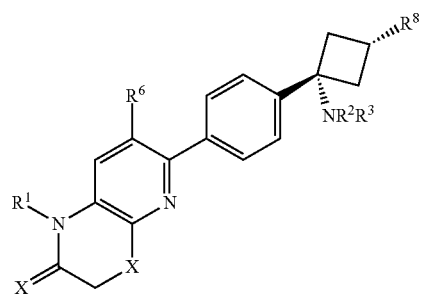

or a pharmaceutically acceptable salt thereof, wherein Fe is selected from —OH, —CN, halogen, and $C_1$-$C_6$ alkyl.

In some embodiments, the compound of formula (I) is

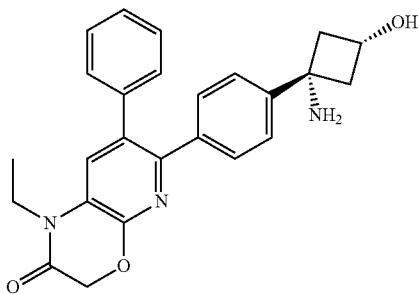 [SMILES: CCN1C(=O)COc2nc(-c3ccc([C@]4(N)C[C@@H](O)C4)cc3)c(-c3ccccc3)cc21]

or a pharmaceutically acceptable salt thereof.

In some embodiments, the pharmaceutically acceptable salt is a tartrate salt, a mesylate salt, or a phosphate salt. In some embodiments, the pharmaceutically acceptable salt is a tartrate salt. In some such embodiments the tartrate salt is the L-tartrate salt.

In some embodiments, the compound is formulated for oral administration to the subject.

In some embodiments, the subject is a human. In some embodiments, the subject is an adult human. In some such embodiments, the compound of formula (I) is administered to the subject at a dose of 20 to 75 mg Q.D. In other such embodiments, the compound of formula (I) is administered to the subject at a dose of 10 to 50 mg Q.D., 20 to 40 mg Q.D., or 20 to 30 mg Q.D.

In some embodiments, the treatment of HHT comprises reducing frequency, duration or intensity of bleeding associated with HHT. In some such embodiments, the bleeding associated with HHT is gastrointestinal (GI) bleeding. In some embodiments, the bleeding associated with HHT is nosebleeds.

In some embodiments, the treatment of HHT comprises increasing haemoglobin levels in the subject.

In some embodiments, the treatment of HHT comprises reducing the number of telangiectasia in the subject. In some embodiments, the treatment of HHT comprises reducing the size of telangiectasia in the subject. In some embodiments, the telangiectasia are skin telangiectasia. In some embodiments, the telangiectasia are nasal telangiectasia. In some embodiments, the telangiectasia are oral telangiectasia. In some embodiments, the telangiectasia are gastrointestinal telangiectasia.

In some embodiments, the treatment of HHT comprises reducing number and or size of arteriovenous malformations (AVMs) in the subject. In some embodiments, the treatment of HHT comprises preventing the formation of AVMs in the subject. In some such embodiments, the arteriovenous malformations are pulmonary AVMs. In some embodiments, the arteriovenous malformations are cerebral (brain) AVMs. In some embodiments, the arteriovenous malformations are visceral AVMs.

In some embodiments, the treatment of HHT comprises reduction in cardiac insufficiency and pulmonary arterial hypertension (PAH). In some embodiments, the treatment of HHT comprises prevention of cardiac insufficiency and pulmonary arterial hypertension (PAH).

In some embodiments, the treatment of HHT comprises prevention of right to left shunt induced by pulmonary AVMs in the subject. In some embodiments, the treatment of HHT comprises reduction in the grade of right to left shunt induced by pulmonary AVMs in the subject.

In some embodiments, the treatment of HHT comprises a reduction in the need for iron supplementation in the subject, for example a reduction of the number of iron infusions required by the subject. In some embodiments, the treatment of HHT comprises a reduction of the number of blood transfusions required by the subject.

In some embodiments, the treatment of HHT comprises a decrease in hepatic blood flow.

In some embodiments, the treatment of HHT reduces the need for liver transplantation in the subject.

In some embodiments, the treatment of HHT comprises a reduction in the frequency and/or severity of additional symptoms of HHT. Such additional symptoms may include dyspnea, migraine, fatigue, neurological events, and embolic events.

The present invention also provides the use of a compound of formula (I), or a pharmaceutically acceptable salt thereof, as defined in any of the above embodiments for the manufacture of a medicament for the treatment of Hereditary Hemorrhagic Telangiectasia (HHT).

The present invention also provides a method of treating of Hereditary Hemorrhagic Telangiectasia (HHT) in a subject in need thereof, comprising administering to the subject an effective amount of a compound of formula (I) or a pharmaceutically acceptable salt thereof as defined in any of the above embodiments.

In some embodiments, the method of treating HHT results in a reduction in frequency, duration or intensity of bleeding associated with HHT. In some such embodiments, the bleeding associated with HHT is gastrointestinal (GI) bleeding. In some embodiments, the bleeding associated with HHT is nosebleeds.

In some embodiments, the method of treating HHT results in an increase in haemoglobin levels in the subject.

In some embodiments, the method of treating HHT results in a reduction in number of telangiectasia in the subject. In some embodiments, the method of treating HHT results in a reduction in size of telangiectasia in the subject. In some embodiments, the telangiectasia are skin telangiectasia. In some embodiments, the telangiectasia are nasal telangiectasia. In some embodiments, the telangiectasia are oral telangiectasia. In some embodiments, the telangiectasia are gastrointestinal telangiectasia.

In some embodiments, the method of treating HHT results in a reduction in number of arteriovenous malformations (AVMs) in the subject. In some embodiments, the method of treating HHT results in a reduction in size of arteriovenous malformations (AVMs) in the subject. In some embodiments, the method prevents the formation of AVMs in the subject. In some such embodiments, the arteriovenous malformations are pulmonary AVMs. In some embodiments, the arteriovenous malformations are brain AVMs. In some embodiments, the arteriovenous malformations are visceral AVMs.

In some embodiments, the method of treating HHT results in an improvement in the quality of life of the subject.

In some embodiments, the method of treating HHT results in a reduction in cardiac insufficiency and pulmonary arterial hypertension (PAH). In some embodiments, the method of treating HHT results in the prevention of cardiac insufficiency and pulmonary arterial hypertension (PAH).

In some embodiments, the method of treating HHT prevents right to left shunt induced by pulmonary AVMs in the subject. In some embodiments, the method of treating HHT results in a reduction in the grade of right to left shunt induced by pulmonary AVMs in the subject.

In some embodiments, the method of treating HHT results in a reduction in the need for iron supplementation in the subject, for example a reduction of the number of iron infusions required by the subject. In some embodiments, the method of treating HHT results in a reduction of the number of blood transfusions required by the subject.

In some embodiments, the method of treating HHT results in a decrease in hepatic blood flow.

In some embodiments, the method of treating HHT reduces the need for liver transplantation in the subject.

In some embodiments, the method of treating HHT results in a reduction in the frequency and/or severity of additional symptoms of HHT. Such additional symptoms may include dyspnea, migraine, fatigue, neurological events, and embolic events.

In some embodiments, the method of treating HHT results in an overall improvement in the quality of life of the subject.

BRIEF DESCRIPTION OF THE DRAWINGS

FIG. 1A shows the overall structure of compound 6 in complex with AKT2. FIG. 1B shows the structure of the complex, zoomed in on the allosteric pocket and showing the amino acid interactions.

As illustrated in FIG. 2A, AKT1, AKT2 and AKT3 have a very high level of sequence homology. PDK1 is located on the same main branch (labelled "AGC") as AKT1/2/3, indicating a relatively high level of sequence homology with AKT1/2/3; whereas p38α is on an entirely different main branch (labelled "CMGC"), indicating low levels of sequence homology between AKT1/2/3 and p38α.

FIG. 3(A) shows pup lethality and FIG. 3(B) shows animal body weight difference between postnatal day 4 (P4) and P7. All error bars represent S.E.M. ****$p<0.0001$ results from one way Anova and Dunnet's post hoc tests comparing the mean of each group to control group injected with the vehicle alone. "ns"=non significant.

FIG. 4 shows that perifosine has poor anti-angiogenic properties in mice.

FIG. 5 shows the effectiveness of Perifosine to prevent AVM formation in Eng-iKO mouse model.

FIG. 6(A) shows pup lethality and FIG. 6(B) shows animal body weight difference between postnatal day 4 (P4) and P7. All error bars represent S.E.M. *$p<0.05$ results from one way Anova and Dunnet's post hoc tests comparing the mean of each group to control group injected with the vehicle alone. "ns"=non significant.

FIG. 7 shows anti-angiogenic properties of Uprosertib in mice.

FIG. 10 shows the effectiveness of VAD044 to prevent AVM formation in Eng-iKO mouse model.

DETAILED DESCRIPTION OF THE INVENTION

Figure 1C:
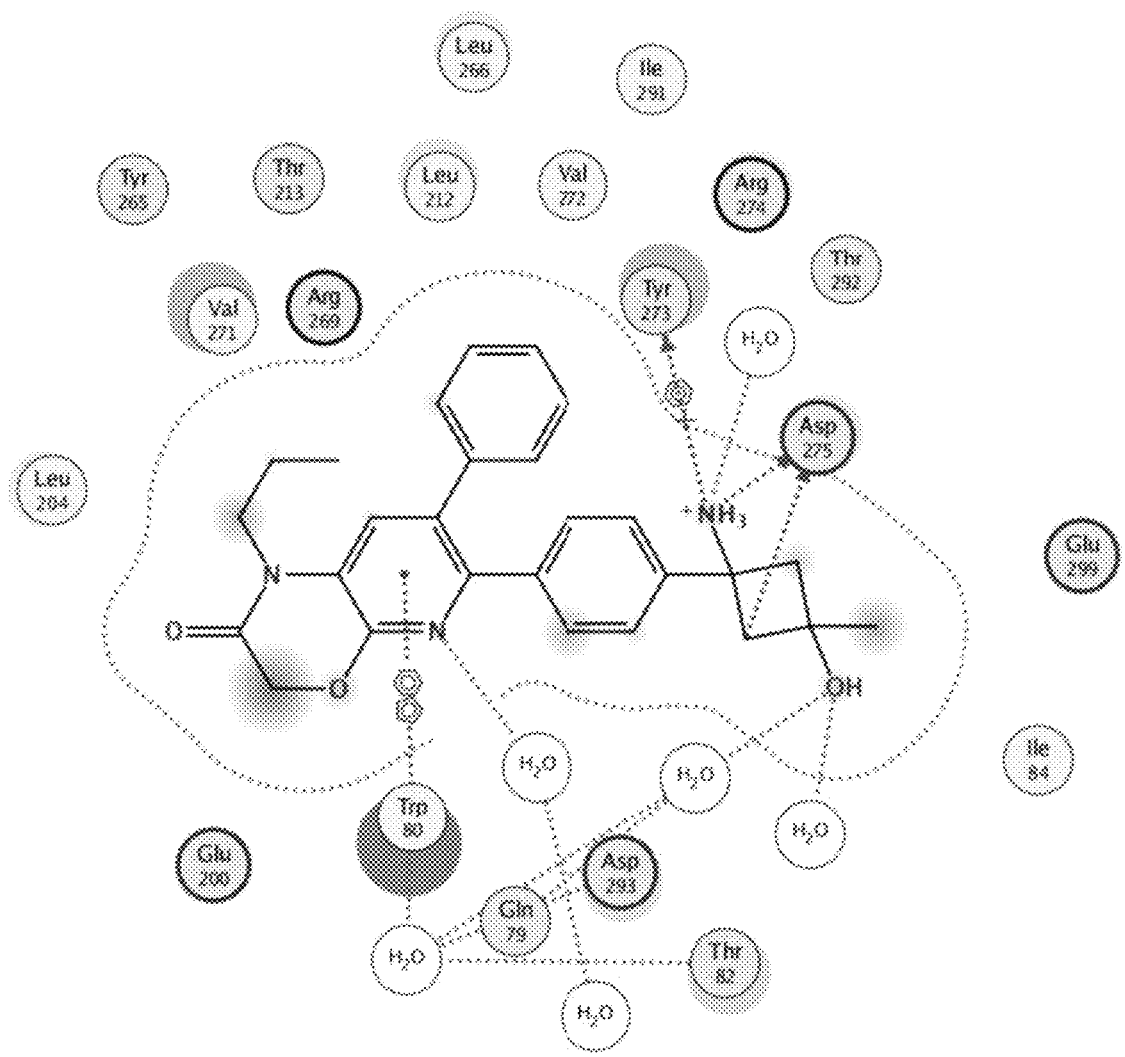
FIG. 1C is a schematic view of the amino acid interactions.
Figure 1D:
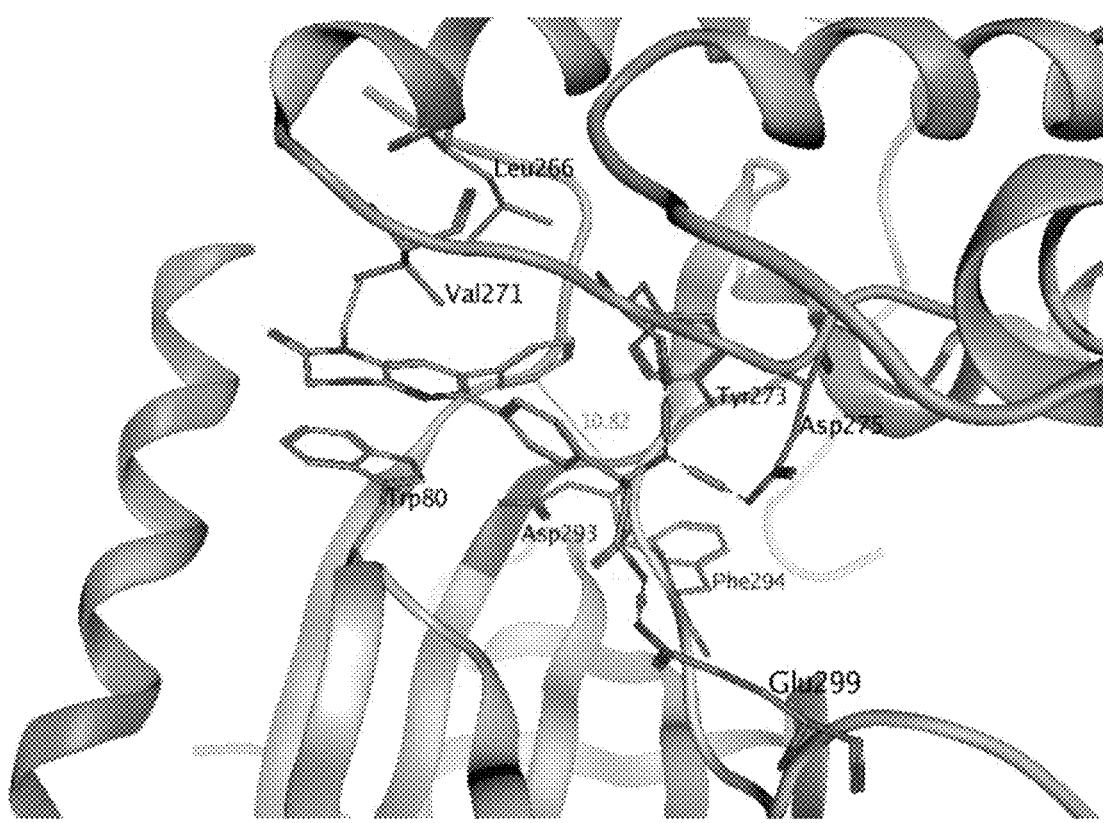
FIG. 1D shows the structure of free base of VAD044 in complex with AKT2 (zoomed in on the allosteric pocket and showing the amino acid interactions).
Figure 1E:
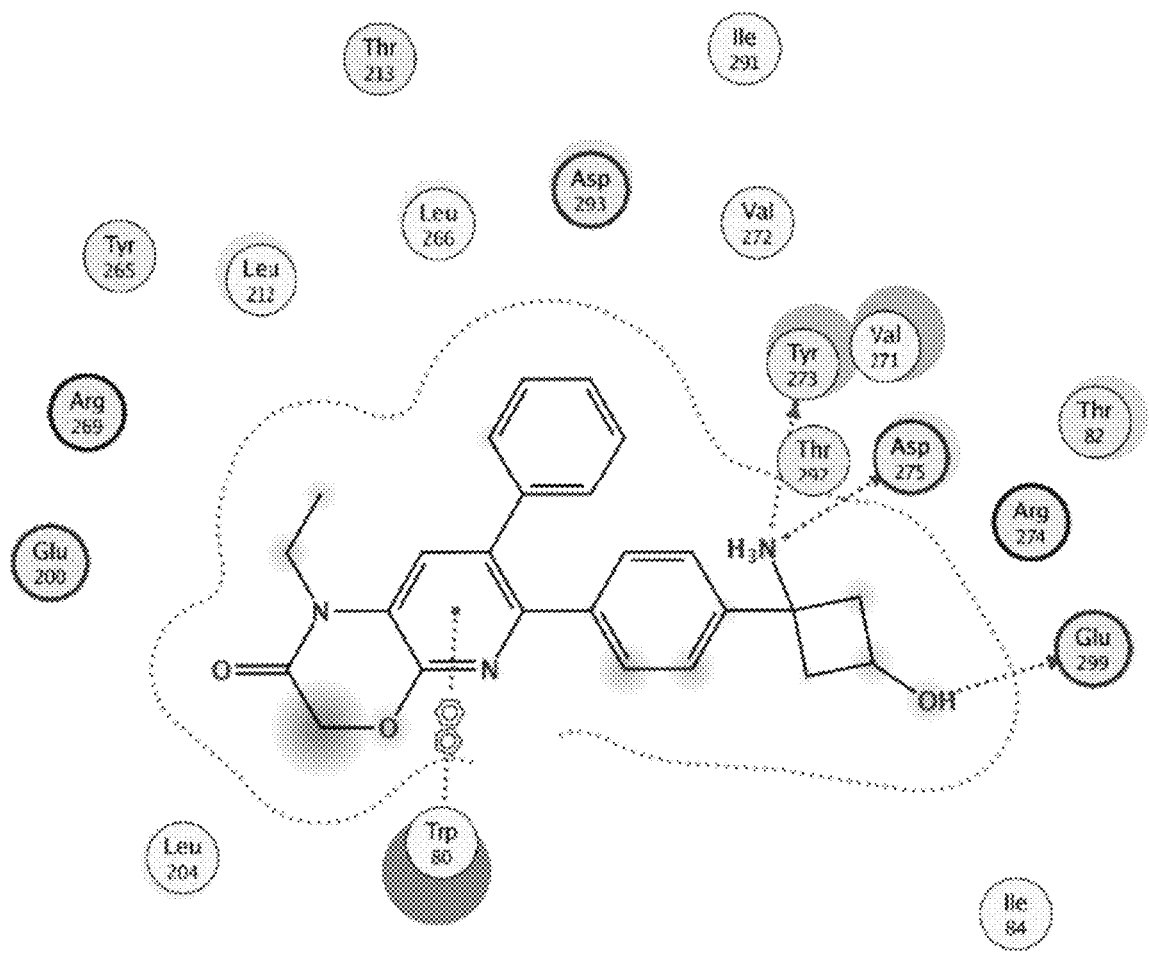
FIG. 1E is a schematic view of the amino acid interactions

As discussed above, targeting of the Pi3K/AKT/mTOR signaling pathway may provide a therapeutic strategy for the treatment of HHT. However, safe and effective treatment agents are as-yet unknown.

AKT is a serine/threonine protein kinase which has three isoforms: AKT1, AKT2 and AKT3. AKT1 has an essential function in endothelial cells by regulating important downstream effectors (e.g. eNOS, Ang2 and FOXOs) that promote several aspects of angiogenic signaling such as sprout elongation and vessel remodeling (Lee et al., (2014), "Endothelial Akt1 mediates angiogenesis by phosphorylating multiple angiogenic substrates", Proceedings of the National Academy of Sciences of the United States of America. https://doi.org/10.1073/pnas.1408472111). Several studies have shown that sustained endothelial AKT activation causes increased blood vessel size and generalized edema from chronic vascular permeability (Phung et al., (2006), "Pathological angiogenesis is induced by sustained Akt signaling and inhibited by rapamycin", Cancer Cell. https://doi.org/10.1016/j.ccr.2006.07.003). Similarly, uncontrolled activation of AKT1 in endothelial cells induces vascular malformation in vivo (Perry et al., (2007), "AKT1 overexpression in endothelial cells leads to the development of cutaneous vascular malformations in vivo", Archives of Dermatology. https://doi.org/10.1001/archderm.143.4.50). AKT could therefore be a key molecular target to control pathological angiogenesis and vascular malformation observed in HHT.

The present inventors tested different types of AKT inhibitors and evaluated their toxicity profiles, their effect on normal angiogenesis, and their ability to prevent the development of vascular malformations in a mouse model of HHT. The results are discussed in detail in the Examples below.

In summary, the present inventors surprisingly found that a particular allosteric AKT inhibitor having formula (I) below was able to prevent the development of vascular malformations in the Eng-iKO mouse model of HHT type 1 (HHT1). As discussed in more detail in the Examples, below, the safety/toxicity profile this compound (and two other comparative AKT inhibitors) was obtained, and the minimal effective doses of each compound for inhibition of angiogenesis in C57BL/6J wildtype mice at postnatal day 7 (P7) were determined using the neonatal retinal angiogenesis model. The minimal effective dose of each compound for prevention of the development of Arteriovenous Malformations (AVMs) in Eng-iKO mice was also determined for each compound.

The present inventors have unexpectedly found that the allosteric AKT inhibitors of formula (I) are able to treat and/or prevent vascular malformations associated with HHT at surprisingly low dosages (approximately 10 times lower than the dosages typically used in oncology), while demonstrating an acceptable safety profile.

In a first aspect, the present invention thus provides a compound of formula (I):

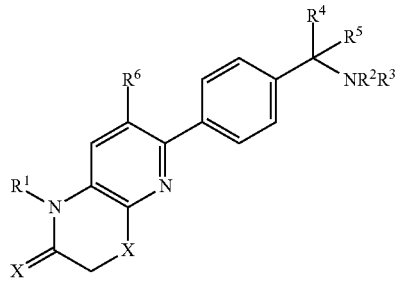

or a pharmaceutically acceptable salt thereof, for use in the treatment of HHT in a subject, wherein:
- each X is independently O or S;
- $R^1$ is selected from hydrogen and $C_1$-$C_{10}$ alkyl, wherein each $C_1$-$C_{10}$ alkyl is optionally substituted with one or more substituents selected from halogen, —CN, —OW or 3-6 membered cycloalkyl;
- $R^2$ and $R^3$ are each independently selected from hydrogen and $C_1$-$C_{10}$ alkyl; or $R^2$ and $R^3$, together with the nitrogen atom to which they are attached, form a 3-6 membered heterocyclic ring;
- $R^4$ and $R^5$ are each independently selected from $C_1$-$C_6$ alkyl, $C_2$-$C_6$ alkenyl, or $C_2$-$C_6$ alkynyl; or $R^4$ and $R^5$, together with the carbon atom to which they are attached, form a 3-6 membered cycloalkyl or heterocyclic ring which is optionally substituted with one or more substituents selected from $C_1$-$C_{10}$ alkyl, —CN, —OW, halogen, —$COR^7$, $CO_2R^7$, $CONR^7{}_2$ and —$NR^7{}_2$;
- $R^6$ is a 5-7 membered aryl or heteroaryl ring which is optionally substituted with one or more substituents selected from $C_1$-$C_{10}$ alkyl, —CN, —OW, halogen, —$COR^7$, $CO_2R^7$, $CONR^7{}_2$ and —$NR^7{}_2$; and
- each $R^7$ is independently selected from hydrogen and $C_1$-$C_{10}$ alkyl.

In some embodiments, the compound of formula (I) has the structure:

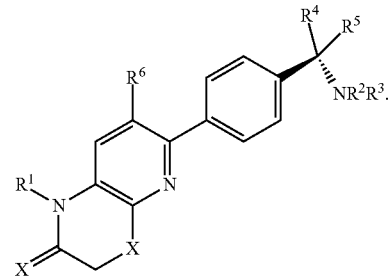

In some embodiments, $R^6$ is phenyl substituted with one or more substituents selected from $C_1$-$C_{10}$ alkyl, —CN, —OW, halogen, —$COR^7$, $CO_2R^7$, $CONR^7{}_2$ and —$NR^7{}_2$. In some embodiments, the one or more substituents are selected from $C_1$-$C_6$ alkyl, —CN, —OH and halogen. In other embodiments, $R^6$ is unsubstituted phenyl.

In some embodiments, $R^6$ is a 5-7 membered heteroaryl ring which is substituted with one or more substituents selected from $C_1$-$C_{10}$ alkyl, —CN, —OW, halogen, —$COR^7$, $CO_2R^7$, $CONR^7{}_2$ and —$NR^7{}_2$. In some embodiments, the one or more substituents are selected from $C_1$-$C_6$ alkyl, —CN, —OH and halogen. In other embodiments, $R^6$ is an unsubstituted 5-7 membered heteroaryl ring. In certain embodiments, the heteroaryl ring is a 6-membered heteroaryl ring. In some embodiments, the heteroaryl ring contains at least one nitrogen atom. In some embodiments, the heteroaryl ring contains at least one oxygen atom. In some embodiments, the heteroaryl ring contains at least one sulfur atom. For example, the heteroaryl ring may be pyridine, pyran, thiopyran, pyrrole, furan or thiophene.

In some embodiments $R^4$ and $R^5$, together with the carbon atom to which they are attached, form a 3-6 membered unsubstituted cycloalkyl or heterocyclic ring. In other embodiments $R^4$ and $R^5$, together with the carbon atom to which they are attached, form a 3-6 membered unsubstituted cycloalkyl or heterocyclic ring which is substituted with one or more substituents selected from $C_1$-$C_{10}$ alkyl, —CN, —OW, halogen, —$COR^7$, $CO_2R^7$, $CONR^7_2$ and —$NR^7_2$. For example, the cycloalkyl ring may be a cyclopropyl ring, a cyclobutyl ring, a cyclopentyl ring, or a cyclohexyl ring. In some embodiments the heterocyclic ring contains at least one nitrogen atom. In some embodiments, the heterocyclic ring contains at least one oxygen atom. In some embodiments, the heterocyclic ring contains at least one sulfur atom. For example, the heterocyclic ring may be piperidine, tetrahydropyran, thiane, pyrrolidine, tetrahydrofuran, or tetrahydrothiophene.

In some embodiments $R^4$ and $R^5$, together with the carbon atom to which they are attached, form an unsubstituted cyclopropyl, cyclobutyl, cyclopentyl, or cyclohexyl ring. In other embodiments, the cyclopropyl, cyclobutyl, cyclopentyl, or cyclohexyl ring is substituted with one or more substituents selected from $C_1$-$C_{10}$ alkyl, —CN, —OW, halogen, —$COR^7$, $CO_2R^7$, $CONR^7_2$ and —$NR^7_2$. In some embodiments, the one or more substituents are selected from $C_1$-$C_6$ alkyl, —CN, —OH and halogen. In some embodiments $R^4$ and $R^5$, together with the carbon atom to which they are attached, form an unsubstituted cyclobutyl ring. In other embodiments, the cyclobutyl ring is substituted with one or more substituents selected from $C_1$-$C_{10}$ alkyl, —CN, —OW, halogen, —$COR^7$, $CO_2R^7$, $CONR^7_2$ and —$NR^7_2$. In some embodiments, the one or more substituents is selected from $C_1$-$C_6$ alkyl, —CN, —OH and halogen.

In some embodiments, each X is O.

In some embodiments, $R^1$ is unsubstituted $C_1$-$C_{10}$ alkyl, unsubstituted $C_1$-$C_6$ alkyl, or unsubstituted $C_1$-$C_4$ alkyl. In some embodiments, $R^1$ is methyl, ethyl, propyl, butyl, pentyl or hexyl. In some embodiments, $R^1$ is methyl, ethyl, n-propyl, i-propyl, n-butyl, i-butyl, or t-butyl. In some embodiments, $R^1$ is methyl or ethyl. In some embodiments, $R^1$ is $C_1$-$C_{10}$ alkyl, $C_1$-$C_6$ alkyl, or $C_1$-$C_4$ alkyl, substituted with one or more substituents selected from halogen, —CN, —OH or 3-6 membered cycloalkyl. In some embodiments, $R^1$ is —$(CH_2)_n CN$, wherein n is 1, 2, 3, 4 or 5.

In some embodiments, $R^2$ and $R^3$ are each independently selected from hydrogen and $C_1$-$C_{10}$ alkyl. In some embodiments, $R^2$ and $R^3$ are each independently selected from hydrogen and $C_1$-$C_6$ alkyl. In some embodiments, $R^2$ and $R^3$ are each independently selected from hydrogen, methyl and ethyl. In some embodiments, $R^2$ and $R^3$ are each hydrogen.

In some embodiments, the compound of formula (I) is:

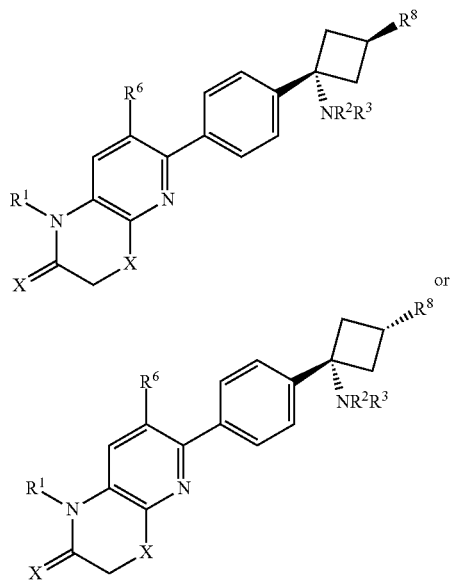

or a pharmaceutically acceptable salt thereof, wherein Fe is selected from —OH, —CN, halogen, or $C_1$-$C_6$ alkyl.

In some embodiments, the compound of formula (I) is

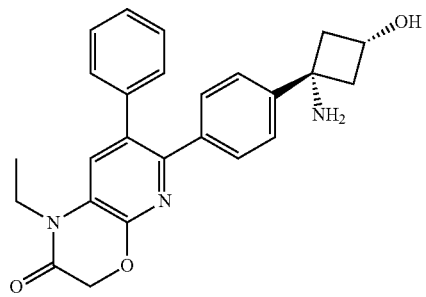 [SMILES: CCN1C(=O)COc2nc(-c3ccc([C@]4(N)C[C@@H](O)C4)cc3)c(-c3ccccc3)cc21]

or a pharmaceutically acceptable salt thereof.

In some embodiments, the pharmaceutically acceptable salt is a tartrate salt, a mesylate salt, or a phosphate salt. In some embodiments, the pharmaceutically acceptable salt is a tartrate salt. In some such embodiments, the tartrate salt is the L-tartrate salt.

In some embodiments, the compound is formulated for oral administration to the subject.

In some embodiments, the treatment of HHT comprises reducing frequency, duration or intensity of bleeding associated with HHT. In some such embodiments, the bleeding associated with HHT is gastrointestinal (GI) bleeding. In some embodiments, the bleeding associated with HHT is nosebleeds.

In some embodiments, the treatment of HHT comprises increasing haemoglobin levels in the subject.

In some embodiments, the treatment of HHT comprises reducing the number of telangiectasia in the subject. In some embodiments, the treatment of HHT comprises reducing the size of telangiectasia in the subject. In some embodiments, the telangiectasia are skin telangiectasia. In some embodiments, the telangiectasia are nasal telangiectasia. In some embodiments, the telangiectasia are oral telangiectasia. In some embodiments, the telangiectasia are gastrointestinal telangiectasia.

In some embodiments, the treatment of HHT comprises reducing the number of arteriovenous malformations (AVMs) in the subject. In some embodiments, the treatment of HHT comprises reducing the size of arteriovenous malformations (AVMs) in the subject. In some embodiments, the treatment of HHT comprises preventing the formation of AVMs in the subject. In some such embodiments, the arteriovenous malformations are pulmonary AVMs. In some embodiments, the arteriovenous malformations are cerebral (brain) AVMs. In some embodiments, the arteriovenous malformations are visceral AVMs.

In some embodiments, the treatment of HHT comprises reduction in cardiac insufficiency and pulmonary arterial hypertension (PAH). In some embodiments, the treatment of HHT comprises prevention of cardiac insufficiency and pulmonary arterial hypertension (PAH).

In some embodiments, the treatment of HHT comprises prevention of right to left shunt induced by pulmonary AVMs in the subject. In some embodiments, the treatment of HHT comprises reduction in the grade of right to left shunt induced by pulmonary AVMs in the subject.

In some embodiments, the treatment of HHT comprises a reduction in the need for iron supplementation in the subject, for example a reduction of the number of iron infusions required by the subject. In some embodiments, the treatment of HHT comprises a reduction of the number of blood transfusions required by the subject.

In some embodiments, the treatment of HHT comprises a decrease in hepatic blood flow.

In some embodiments, the treatment of HHT reduces the need for liver transplantation in the subject.

In some embodiments, the treatment of HHT comprises a reduction in the frequency and/or severity of additional symptoms of HHT. Such additional symptoms may include dyspnea, migraine, fatigue, neurological events, and embolic events.

The present invention also provides a method of treating of Hereditary Hemorrhagic Telangiectasia (HHT) in a subject in need thereof, comprising administering to the subject an effective amount of a compound of formula (I) or a pharmaceutically acceptable salt thereof as defined in any of the above embodiments.

In some embodiments, the method of treating HHT results in a reduction in frequency, duration or intensity of bleeding associated with HHT. In some such embodiments, the bleeding associated with HHT is gastrointestinal (GI) bleeding. In some embodiments, the bleeding associated with HHT is nosebleeds.

In some embodiments, the method of treating HHT results in an increase in haemoglobin levels in the subject.

In some embodiments, the method of treating HHT results in a reduction in number of telangiectasia in the subject. In some embodiments, the method of treating HHT results in a reduction in size of telangiectasia in the subject. In some embodiments, the telangiectasia are skin telangiectasia. In some embodiments, the telangiectasia are nasal telangiectasia. In some embodiments, the telangiectasia are oral telangiectasia. In some embodiments, the telangiectasia are gastrointestinal telangiectasia.

In some embodiments, the method of treating HHT results in a reduction in number of arteriovenous malformations (AVMs) in the subject. In some embodiments, the method of treating HHT results in a reduction in size of arteriovenous malformations (AVMs) in the subject. In some embodiments, the method prevents the formation of AVMs in the subject. In some such embodiments, the arteriovenous malformations are pulmonary AVMs. In some embodiments, the arteriovenous malformations are brain AVMs. In some embodiments, the arteriovenous malformations are visceral AVMs.

In some embodiments, the method of treating HHT results in an improvement in the quality of life of the subject.

In some embodiments, the method of treating HHT results in a reduction in cardiac insufficiency and pulmonary arterial hypertension (PAH). In some embodiments, the method of treating HHT results in the prevention of cardiac insufficiency and pulmonary arterial hypertension (PAH).

In some embodiments, the method of treating HHT prevents right to left shunt induced by pulmonary AVMs in the subject. In some embodiments, the method of treating HHT results in a reduction in the grade of right to left shunt induced by pulmonary AVMs in the subject.

In some embodiments, the method of treating HHT results in a reduction in the need for iron supplementation in the subject, for example a reduction of the number of iron infusions required by the subject. In some embodiments, the method of treating HHT results in a reduction of the number of blood transfusions required by the subject.

In some embodiments, the method of treating HHT results in a decrease in hepatic blood flow.

In some embodiments, the method of treating HHT reduces the need for liver transplantation in the subject.

In some embodiments, the method of treating HHT results in a reduction in the frequency and/or severity of additional symptoms of HHT. Such additional symptoms may include dyspnea, migraine, fatigue, neurological events, and embolic events.

In some embodiments, the method of treating HHT results in an overall improvement in the quality of life of the subject.

Definitions and Abbreviations

As used herein, the term "allosteric AKT inhibitor" means a substance which inhibits the activity of AKT by binding to the AKT at a site other than the active site of the enzyme.

As used herein, the term "halogen" refers to —F, —Cl, —Br and —I.

Abbreviations

TABLE 1

| Abbreviations | |
|---|---|
| HHT | Hereditary Hemorrhagic Telangiectasia |
| AVM | arteriovenous malformation |
| AV | arteriovenous |
| Eng-iKO | Endoglin-induced knockout |
| ALK1 (also known as ACVRL1) | Activin receptor-like kinase 1 |
| BMP | Bone Morphogenetic Protein |
| TGF-β | Transforming Growth Factor-β |
| VEGF | vascular endothelial growth factor |
| PI3K | Phosphoinositide 3-kinase |
| AKT | Protein Kinase B (also known as PKB) |
| PTEN | Phosphatase and tensin homolog |
| mTOR | Mammalian target of rapamycin |
| eNOS | Endothelial nitric oxide synthase |
| Ang2 | Angiogenin 2 |
| FOXOs | Forkhead box proteins (O class) |
| iKO | inducible knockout |
| IP injection | Intraperitoneal injection |
| PFA | Paraformaldehyde |
| PBS | Phosphate-buffered saline |
| BSA | Bovine serum albumin |
| a-SMA | Alpha smooth muscle actin |
| FITC | Fluorescein isothiocyanide |

TABLE 1-continued

| Abbreviations | |
|---|---|
| ANOVA | Analysis of variance |
| SEM | Standard error of the mean |
| ATP | Adenosine triphosphate |
| PKA | protein kinase A |
| PKC | protein kinase C |
| PKG | protein kinase G |
| PRKACA | Protein kinase catalytic subunit alpha |
| PRKACB | Protein kinase catalytic subunit beta |
| cGMP | Cyclic guanosine monophosphate |
| PRKG1 | Protein kinase CGMP-dependent 1 |
| ROCK | Rho-associated protein kinase |
| Px | Postnatal day x |
| Q.D. | quaque die (i.e. once a day) |

EXAMPLES

Example 1: Synthesis of 6-(4-(1-amino-3-hydroxy-cyclobutyl)phenyl)-1-ethyl-7-phenyl-1H-pyrido[2,3-b][1,4]oxazin-2(3H)-one 6-(4-(1-amino-3-hydroxycyclobutyl)phenyl)-1-ethyl-7-phenyl-1H-pyrido[2,3-b][1,4]oxazin-2(3H)-one (referred to herein as "VAD044 free base") was synthesized in accordance with the protocol as set out in WO2011077098—see in particular Examples 97, 113 and 139 (reproduced below):

Synthesis of 6-(4-((1s,3s)-1-amino-3-hydroxycyclobutyl)phenyl)-1-ethyl-7-phenyl-1H-pyrido[2,3-b][1,4]oxazin-2(3H)-one: from WO2011077098 Example 139

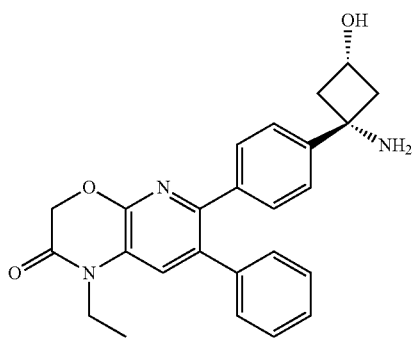 [SMILES: CCN1C(=O)COc2nc(-c3ccc([C@]4(N)C[C@@H](O)C4)cc3)c(-c3ccccc3)cc21]

Step 1: tert-butyl((1s,3s)-1-(4-(1-ethyl-2-oxo-7-phenyl-2,3-dihydro-1H-pyrido[2,3-b][1,4]oxazin-6-yl)phenyl)-3-hydroxycyclobutyl)carbamate In a 15 mL reaction tube was added 6-bromo-1-ethyl-7-phenyl-1H-pyrido[2,3-b][1,4]oxazin-2(3H)-one* (50 mg, 0.150 mmol), tert-butyl((1s,3s)-3-hydroxy-1-(4-(4,4,5,5-tetramethyl-1,3,2-dioxaborolan-2-yl)phenyl)cyclobutyl)carbamate** (49 mg, 0.125 mmol) and cesium carbonate (204 mg, 0.625 mmol) in a mixture of 1,4-dioxane (2.3 ml) and water (0.8 ml) to give a colourless solution. This was degassed by bubbling nitrogen for 15 minutes, followed by the addition of [1,1'-bis(diphenylphosphino)ferrocene]dichloropalladium(II) dichloromethane adduct (20 mg, 0.025 mmol) and degassing for a further 5 minutes. The reaction mixture was heated to 50° C. under a nitrogen atmosphere for one hour then allowed to cool to room temperature, diluted with water (5 ml) and extracted into ethyl acetate (3×5 ml). The combined organic phases were dried over $Na_2SO_4$, filtered and concentrated to dryness under reduced pressure. The residue was purified by Biotage chromatography (cyclohexane:ethyl acetate, gradient elution from 90:10 to 0:100) to give the desired product as an off-white solid (45 mg, 70% yield). $^1$H-NMR (500 MHz, $CDCl_3$) δ 7.29-7.35 (5H, m), 7.28 (1H, s), 7.18-7.24 (4H, m), 4.96 (1H, br s), 4.88 (2H, s), 4.05 (1H, br s), 4.01 (2H, q), 2.98 (2H, br s), 2.75 (2H, br s), 1.20-1.51 (9H, br m), 1.32 (3H, t). LCMS (Method D) RT=1.25 min, M+H$^+$=516.20.

Step 2: 6-(4-((1s,3s)-1-amino-3-hydroxycyclobutyl)phenyl)-1-ethyl-7-phenyl-1H-pyrido[2,3-b][1,4]oxazin-2(3H)-one tert-butyl((1s,3s)-1-(4-(1-ethyl-2-oxo-7-phenyl-2,3-dihydro-1H-pyrido[2,3-b][1,4]oxazin-6-yl)phenyl)-3-hydroxycyclobutyl)carbamate (45 mg, 0.087 mmol) was dissolved in TFA (1 mL) and stirred for 30 seconds. The solution was immediately concentrated to dryness under reduced pressure. The residue was dissolved in diethyl ether (~3 mL) and concentrated to dryness under reduced pressure three times. The residue was then slurried in diethyl ether (3 mL) and after settling the supernatant solvent removed by pipette. This was repeated three times. The remaining solvent was removed by freeze drying overnight to give the desired compound as an off-white solid (33 mg, 71% yield). $^1$H-NMR (500 MHz, MeOD) δ 7.55 (1H, s), 7.39-7.42 (4H, m), 7.27-7.31 (3H, m), 7.20-7.24 (2H, m), 4.93 (2H, s), 4.01-4.11 (3H, m), 3.03-3.11 (2H, m), 2.42-2.50 (2H, m), 1.28 (3H, t). LCMS (Method D) RT=0.74 min, M+H$^+$=416.20.

*Synthesis of 6-bromo-1-ethyl-7-phenyl-1H-pyrido[2,3-b][1,4]oxazin-2(3H)-one: from WO2011077098 Example 113 (steps 1-4) and page 222 (step 5)

Step 1: Ethyl 2-((5-bromo-3-nitropyridin-2-yl)oxy)acetate

To a suspension of sodium hydride (5.31 g, 133 mmol) in 1,4-dioxane (250 ml), ethyl glycolate (12.56 ml, 133 mmol) was added drop wise over a period of 30 minutes ensuring that the temperature was maintained below 30° C. The resulting thick suspension was stirred at room temperature for 15 minutes. In a separate 1 l round-bottomed flask was added 5-bromo-2-chloro-3-nitropyridine (21 g, 88 mmol) in 1,4-dioxane (150 ml) to give a brown solution. The suspension of sodium hydride and ethyl glycolate was added drop wise over a period of 30 minutes at 0° C. The resulting reaction mixture was heated to 80° C. overnight.

The reaction mixture was concentrated under reduced pressure and the crude residue was purified by Biotage silica chromatography (gradient 0% to 10% ethyl acetate in n-hexanes) to give the title compound (1.8 g, 44%). $^1$H NMR (500 MHz, $CDCl_3$) δ 8.48 (1H, s), 8.42 (1H, s), 5.07 (2H, s), 4.28-4.24 (2H, q), 1.31-1.28 (3H, t).

Step 2: Ethyl 2-((3-nitro-5-phenylpyridin-2-yl)oxy)acetate

In a 1 l round-bottomed flask was added ethyl 2-(5-bromo-3-nitropyridin-2-yloxy)acetate (18.33 g, 60.1 mmol), phenylboronic acid (10.99 g, 90 mmol), triphenylphosphine (4.73 g, 18.02 mmol) and cesium fluoride (45.6 g, 300 mmol) in 1,2-dimethoxyethane (300 ml) to give a yellow solution. The reaction mixture was degassed by bubbling nitrogen for 30 minutes. Palladium(II) acetate (2.023 g, 9.01 mmol) was added and the mixture was heated to 75° C. under a nitrogen atmosphere overnight. The reaction mixture was allowed to cool to room temperature and concentrated to dryness under reduced pressure to give a brown solid. This was re-dissolved in dichloromethane, filtered and concentrated to dryness under reduced pressure to give a brown solid The crude residue was purified via Biotage chromatography (gradient 5% to 60% ethyl acetate in n-hexanes) to give the title compound (6.9 g, 38%). 1H NMR (500 MHz, CDCl$_3$) δ 8.58 (1H, s), 8.56 (1H, s), 7.59-7.52 (2H, m), 7.48-7.46 (2H, m), 7.45-7.43 (1H, m), 5.13 (2H, s), 4.30-4.26 (2H, q), 1.33-1.30 (3H, t).

Step 3: 7-Phenyl-1H-pyrido[2,3-b][1,4]oxazin-2 (3H)-one

In a 500 ml round-bottomed flask was added ethyl 2-(3-nitro-5-phenylpyridin-2-yloxy)acetate (4.6 g, 15.22 mmol) in hydrochloric acid, 37% (40 ml) to give a yellow suspension. The mixture was cooled to 0-5° C. followed by the portion wise addition of tin powder (9.94 g, 84 mmol). The addition proved to be exothermic. Caution should be taken while adding. The mixture was then stirred at room temperature for further 30 minutes until all foaming ceased. The reaction mixture was heated to 80° C. under a nitrogen atmosphere for 3 hours. The reaction mixture cooled to room temperature and diluted with water (800 ml). The white precipitate was isolated by filtration, washed with water (100 ml) and sucked dry to give a white solid. The solid was azeotroped with toluene (3×30 ml) to give a white solid as the title compound (2.6 g, 77%). 1H NMR (500 MHz, (CD$_3$)$_2$SO) δ 10.41 (1H, s), 8.10 (1H, s), 7.59 (2H, d), 7.49-7.42 (2H, t), 7.39-7-38 (1H, d), 4.83 (2H, s).

Step 4: 6-bromo-7-phenyl-1H-pyrido[2,3-b][1,4] oxazin-2(3H)-one

In a 10 ml microwave vial was 7-phenyl-1H-pyrido[2,3-b][1,4]oxazin-2(3H)-one (50 mg, 0.221 mmol) and N-bromosuccinimide (78.6 mg, 0.441 mmol) in dimethylformamide (1 ml). The reaction mixture was heated to 80° C. under microwave irradiation for 30 minutes. The reaction mixture was cooled to room temperature and diluted with ethyl acetate (10 ml). The organic solution was washed with water (2×10 ml) and brine (2×10 ml). The organic phase was dried over anhydrous Na$_2$SO$_4$, filtered and concentrated under reduced pressure. The crude residue was purified via Biotage chromatography (gradient 0% to 5% methanol in dichloromethane) to give the title compound as a yellow solid (61 mg, 90%). $^1$H NMR (500 MHz, CD3OD) δ 7.48-7.32 (5H, m), 7.12 (1H, s), 4.82 (2H, s).

Step 5: 6-bromo-1-ethyl-7-phenyl-1H-pyrido[2,3-b] [1,4]oxazin-2(3H)-one

In a 15 mL reaction tube was added 6-bromo-7-phenyl-1H-pyrido[2,3-b][1,4]oxazin-2(3H)-one (300 mg, 0.983 mmol), iodoethane (0.095 mL, 1.180 mmol) and potassium carbonate (408 mg, 2.95 mmol) in anhydrous N,N-dimethylformamide (1 mL) to give a brown suspension. This was stirred at 50° C. under a nitrogen atmosphere for 60 minutes. The reaction mixture was diluted with saturated sodium bicarbonate solution (5 mL) and extracted into ethyl acetate (3×5 mL). The combined organic phases were washed with 50:50 water.brine (3×5 mL), dried over Na$_2$SO$_4$, filtered and concentrated to dryness under reduced pressure to give a brown solid. This was purified by Biotage chromatography (25 g silica cartridge, cyclohexane:ethyl acetate, gradient elution from 90:10 to 20:80) to give the title compound as a beige solid (160 mg, 48.8% yield). 1H NMR (500 MHz, CDCl$_3$) δ 7.58-7.37 (5H, m), 7.21 (1H, s), 4.86 (2H, s), 3.96 (2H, q), 1.27 (3H, t). LCMS (Method D) RT 1.293 min, M+1=334.

**Synthesis of tert-butyl((1s,3s)-3-hydroxy-1-(4-(4,4,5,5-tetramethyl-1,3,2-dioxaborolan-2-yl)phenyl) cyclobutyl)carbamate (from WO2011077098 Example 97)

In a 40 mL reaction tube was added tert-butyl(1s,3s)-1-(4-bromophenyl)-3-hydroxycyclobutylcarbamate*** (0.25 g, 0.731 mmol) in anhydrous tetrahydrofuran (14 ml) to give a colourless solution. This was degassed by bubbling nitrogen for 20 minutes, followed by the addition of [1,1'-bis (diphenylphosphino)ferrocene]dichloropalladium(II) dichloromethane adduct (60 mg, 0.073 mmol). After bubbling nitrogen for a further 15 minutes, potassium acetate (143 mg, 1.461 mmol) and bis(pinacolato)diboron (223 mg, 0.877 mmol) were added. The reaction mixture was heated to reflux overnight then concentrated to dryness under reduced pressure and purified by Biotage chromatography (cyclohexane:ethyl acetate, gradient elution from 88:12 to 0:100) to give the desired product as a colourless oil that solidified upon standing (240 mg, 84% yield). $^1$H-NMR (500 MHz, CDCl$_3$) δ 7.71 (2H, d), 7.44 (2H, d), 4.15 (1H, br s), 2.87-2.98 (2H, m), 2.27-2.44 (2H, m), 1.22-1.49 (21H, br m).

(***synthesis described in WO2009148887 and WO2009148916)

Example 2: In Vitro Pharmacodynamics 6-(4-(1-amino-3-hydroxycyclobutyl)phenyl)-1-ethyl-7-phenyl-1H-pyrido[2,3-b][1,4]oxazin-2(3H)-one L-tartrate (VAD044) was found to potently and selectively inhibit the activity of full length AKT1 and AKT2 in a biochemical kinase assay, with IC$_{50}$ values of 125 nM and 95 nM respectively (compared to >500 nM against AKT3). However, mutated forms of all three AKT isoforms containing inactive pleckstrin homology (PH) domains were not inhibited by VAD044. Furthermore, incubating VAD044 with increasing concentrations of ATP had no effect on the IC$_{50}$ value when compared to experiments carried out at K m for ATP. This confirms that the mode of binding for VAD044 is allosteric and independent of ATP concentration.

The postulated allosteric binding mode of VAD044 was validated via a high resolution (2.32 Å) co-crystal structure obtained with a close analog of VAD044 free base (Compound 6, below) in complex with AKT2 (see FIG. 1A).

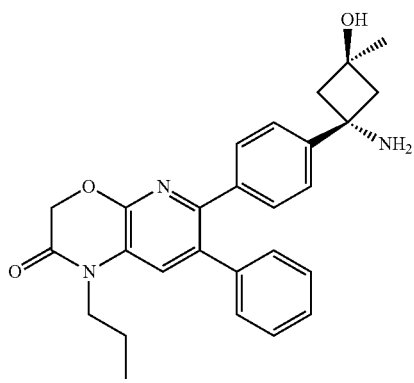

Compound 6

As shown in FIG. 1B, compound 6 binds in an allosteric binding pocket about 10 Å away from the hinge region at the interface of the N- and C-lobes of the kinase domain and the PH domain.

Example 3: Kinase Selectivity, and Receptor and Ion Channel Profile

VAD044 is a potent allosteric inhibitor of AKT1 and AKT2. The selectivity window of VAD044 to target-unrelated protein kinases, G protein coupled receptors and ion channels was tested. A good selectivity window suggests a favorable safety profile at the pharmacological concentrations expected to be efficacious in patients.

Kinase Selectivity

Figure 2:
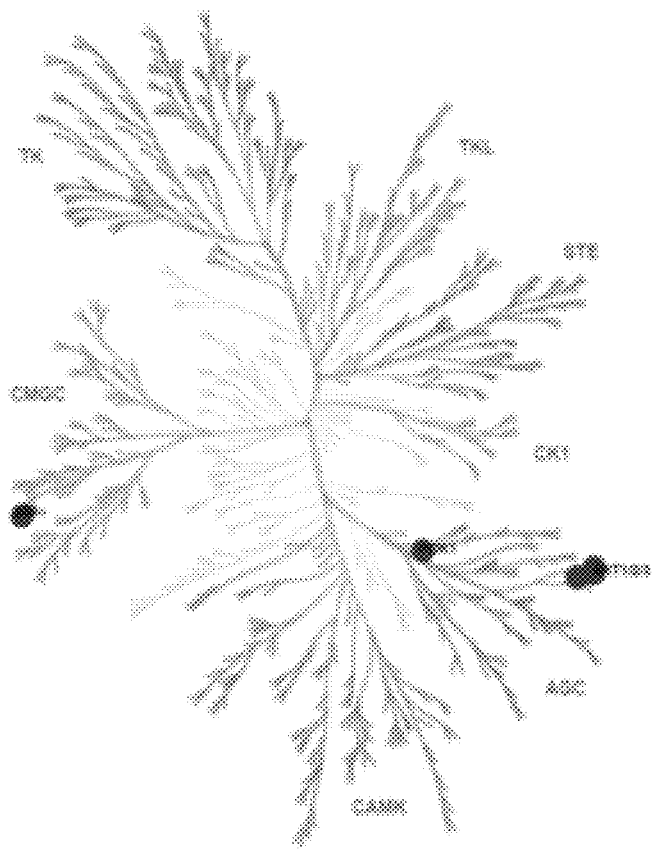
FIG. 2A is a tree diagram showing the relative sequence homology of different kinases (where kinases which are on the same branch and positioned close together have a high level of sequence homology; whereas those positioned on different branches have very different sequence homology).
FIG. 2B shows the % inhibition of these five selected kinases (AKT1, AKT2, AKT3, PDK1 and p38α) achieved by VAD044 (6-(4-(1-amino-3-hydroxycyclobutyl)phenyl)-1-ethyl-7-phenyl-1H-pyrido[2,3-b][1,4]oxazin-2(3H)-one L-tartrate).

VAD044 was shown to be highly selective for AKT1 and AKT2 at 10 µM, when tested against a panel of 450 kinases (achieving 89% inhibition of AKT1 and 95% inhibition of AKT2, as shown in FIG. 2B). Notably, greater than 75% inhibition was achieved with only two other kinases: p38α and PDK1 (84% and 77% inhibition respectively, as also shown in FIG. 2B). Only 72% inhibition of AKT3 was achieved (see FIG. 2B).

Further analysis via a 10-point titration curve confirmed that the $IC_{50}$ for p38α and PDK1 was greater than 10 µM.

In addition, the $IC_{50}$ value for VAD044 was found to be far lower for AKT1 and AKT2 ($IC_{50}$=125 nM and $IC_{50}$=95 nM, respectively) than for the AKT3 isoform (for which the $EC_{50}$ value of VAD044 was greater than 500 nM).

The above results thus demonstrate that VAD044 is a potent and selective inhibitor of AKT1 and AKT2.

Receptor and Ion Channel Profile

When tested at 10 µM, VAD044 did not inhibit the cardiac ion channels Nav1.5, Cav1.2, Kv4.3, KChIP2, Kv1.5, KCNQ1, minK, Kir2.1 and HCN4 below 25% of their activity and showed an excellent selectivity in a panel of 76 receptors and ion channels (Millipore Drug Discovery Safety and Liability Panel). Notably only three G protein-coupled receptors (GPCRs) demonstrated more than 50% inhibition at 10 µM—namely the LPA1, Motilin, and P2Y1 receptors (showing mean percentage inhibition values of 57.4%, 50.0%, and 50.6%, respectively)—and only one GPCR showed agonistic activity with more than 20% increase in GPCR activity (namely GPR14, with an increase of 29.5% observed at 10 µM). These results are shown in Table 2, below:

TABLE 2

Results of Millipore Drug Discovery Safety and Liability Panel

| GPCR target | AGONIST mean % increase in activity | ANTAGONIST mean % inhibition |
|---|---|---|
| 5-HT1A | 2.1 | 30.6 |
| 5-HT2A | 1.3 | −0.7 |
| 5-HT2B | 3.7 | 7.6 |
| 5-HT2C | 0.8 | 21.9 |
| A1 | 0 | 7.7 |
| A2A | 2.3 | 12.5 |
| A3 | 0.2 | 28.5 |
| ADRA1A | −0.7 | 9.9 |
| ADRA1D (DELTA2-79) | −0.1 | 7 |
| ADRA2A | −0.2 | 11.8 |
| ADRB1 | −0.1 | 4.2 |
| ADRB2 | 0.8 | 6.1 |
| AT1 | −0.1 | 5.4 |
| BB2 | −0.9 | 0.9 |
| BDKR2 | −0.4 | 14.6 |
| BLT1 | −0.2 | 5.6 |
| C5aR | −1.2 | 1.5 |
| CB1 | −0.5 | −4.1 |
| CB2 | −0.9 | 10.6 |
| CCK2 | −0.2 | 8.3 |
| CCR1 | 0.2 | 9.5 |
| CCR2B | −0.1 | 9.1 |
| CGRP1 | −0.1 | −7.9 |
| CRF1 | 0 | 2.3 |
| CX3CR1 | 0 | 0.6 |
| CXCR1 | −0.3 | 3.7 |
| CysLT1 | −0.8 | 1.5 |
| D1 | 1.5 | 18.7 |
| D2 | −1.1 | −0.2 |
| D5 | −0.8 | 35.4 |
| DP | −1.7 | 5.8 |
| EP2 | −1 | −0.5 |
| EP3 | −0.1 | 9.2 |
| ETA | −0.4 | 10.5 |
| ETB | −1.1 | 2.9 |
| FP | −0.7 | 13.6 |
| FPR1 | −0.1 | 13.3 |
| GAL1 | 0.3 | 3.4 |
| GnRH | −0.6 | 4 |
| GPR109A | −0.7 | 3.1 |
| GPR14 | 29.5 | 52.9 |
| H1 | −0.2 | 3.8 |
| H2 | −0.2 | −1.8 |
| H3 | −0.6 | 3.5 |
| IP1 | 1.1 | −2.6 |
| LPA1 | −1.3 | 57.4 |
| LPA3 | −0.7 | −0.2 |
| M1 | −0.7 | −3.4 |
| M2 | 0 | 20.6 |
| M3 | −0.5 | 5.3 |
| MC5 | −0.2 | 8.4 |
| Motilin | −0.3 | 50 |
| NK1 | −1.4 | 2.4 |
| NK3 | −0.4 | 16.9 |
| NMU1 | −3.1 | 5.5 |
| NTR1 | −0.6 | 6.1 |
| OPRD1 | −0.9 | 2.8 |
| OPRM1 | −2 | 2.4 |
| OT | −1.2 | 29.5 |
| OX1 | −1.8 | −3.8 |
| P2Y1 | 1 | 50.6 |
| PAC1 | −0.6 | 1.1 |
| PAF | −0.9 | 21 |
| PK1 | 0 | −2.1 |
| PRP | −0.5 | 23.2 |
| PTH1 | −1.1 | −2.5 |
| S1P3 | −0.4 | −0.6 |
| SST4 | −0.8 | 16.5 |
| Thrombin-activated PARs | 0 | −1.2 |
| TP | −0.5 | 0 |
| TSH | −0.1 | −0.5 |
| V1A | −1.5 | 2.5 |

TABLE 2-continued

Results of Millipore Drug Discovery Safety and Liability Panel

| GPCR target | AGONIST mean % increase in activity | ANTAGONIST mean % inhibition |
|---|---|---|
| V2 | −1.5 | 22.8 |
| VPAC1 | −0.7 | 8.5 |
| VPAC2 | 0 | 6.2 |
| Y2 | −2.2 | −5.7 |

The above results demonstrate that VAD044 does not interfere with the tested receptors and ion channels.

The in vitro enzymatic profile of VAD044 can thus be summarized as follows:

VAD044 potently and selectively inhibits AKT1 and AKT2 (IC50=125 nM and 95 nM) with a window of at least 5-fold over AKT3 isoform ((1050>500 nM)

VAD044 does not interfere with the broad panel of tested kinases, receptors and ion channels.

Example 4: Study of Safety/Toxicity; Anti-Angiogenic Properties; and Capacity to Prevent AVM Formation in Eng-iKO Mice of Three AKT Inhibitor Compounds Materials/Methods Mice C57Bl/6J pregnant females were provided by Janvier Labs. EngFlox/flox mice (Mahmoud et al., (2010), "Pathogenesis of arteriovenous malformations in the absence of endoglin", Circulation Research. https://doi.org/10.1161/CIRCRESAHA.109.211037) were crossed with Cdh5 (PAC)-CreERT2 (12) to generate endothelial specific inducible Eng knockout. Animal housing and procedures were in accordance with the Dutch Government guidelines and directive 2010/63/EU of the European Parliament. All efforts were made to minimize the number of animals used and their suffering. The institutional Committee for Animal Welfare of Leiden University Medical Center (project number AVD1160020171628) approved all protocols. Male and female mice were used during the first postnatal week to study retinal angiogenesis.

In Vivo AKT Inhibition

Safety/Toxicity Profile and Identification of the Minimal Effective Dose that Inhibits Angiogenesis:

Wild-type C57Bl/6J pups were injected once at P4 with 5, 10, 25, 50 or 100 mg·kg-1 bodyweight of Perifosine or with 0, 2.5, 5, 10, 25 or 50 mg·kg-1 bodyweight of Uprosertib or with VAD044 at 2.5, 5 and 10 mg·kg-1 and then were killed at P7. Retinas were processed for immunofluorescence staining as described (Lebrin et al., (2010), "Thalidomide stimulates vessel maturation and reduces epistaxis in individuals with hereditary hemorrhagic telangiectasia", Nature Medicine. https://doi.org/10.1038/nm.2131).

Identification of the Minimal Effective Dose that Prevents AVM Formation in Eng-iKO Mice:

The Eng Flox/flox; cdh5-CreERT2 were injected with tamoxifen (50 µg) at P2 to induce nearly complete gene knockout in neonatal mice followed by IP injection of 0, 25 or 50 mg·kg-1 bodyweight of Perifosine once at P3 and P5 or by IP injection of 10 mg·kg-1 bodyweight of Perifosine once at P3, P4, P5 and P6. The same volume of vehicle was injected serving as control animals. Mice were then euthanized at P7 and retinas processed for immunofluorescence staining as described (Lebrin et al., as above).

The EngFlox/flox; cdh5-CreERT2 were injected with tamoxifen (50 mg) at P2 to induce nearly complete gene knockout in neonatal mice followed by IP injection of 0, 1, 2.5 or 5 mg·kg-1 bodyweight of Uprosertib once at P3. The same volume of vehicle was injected serving as control animals. Mice were then euthanized at P7 and retinas processed for immunofluorescence staining as described (Lebrin et al., as above).

The EngFlox/flox; cdh5-CreERT2 were injected with tamoxifen (50 mg) at P2 to induce nearly complete gene knockout in neonatal mice followed by IP injection of 0, 2.5, 5 or 10 mg·kg-1 bodyweight of VAD044 once at P3 and P5. The same volume of vehicle was injected serving as control animals. Mice were then euthanized at P7 and retinas processed for immunofluorescence staining as described (Lebrin et al., as above).

Analysis of the Retinal Vascular Network

For the retinal vascular network, quantification of the number of AV shunts per mouse was done manually. Radial expansion from the optic nerve, vessel length and branch points were analysed by Image J software (US National Institute of Health) in at least 4 fields per retina as described in Lebrin et al., (2010), "Thalidomide stimulates vessel maturation and reduces epistaxis in individuals with hereditary hemorrhagic telangiectasia", Nature Med, 16(4), 420-8; Gkatzis et al., (2016), "Interaction Between ALK1 Signaling and Connexin40 in the Development of Arteriovenous Malformations", Arterioscler Thromb Vasc Biol., 36(4), 707-17; and Thalgott et al., (2018), "Decreased Expression of Vascular Endothelial Growth Factor Receptor 1 Contributes to the Pathogenesis of Hereditary Hemorrhagic Telangiectasia Type 2", Circulation, 138(23), 2698-2712. A custom own-lab made macro allowed automatic processing of the images, using the same processing and quantification parameters. Briefly, the brightness of the images was enhanced by modifying the pixel extreme values, which depends on the specific image histogram content. A Gaussian filter was applied to reduce the intensity in homogeneities. The filter order depended on the image resolution. Next, the threshold step was computed, based on a global threshold technique such as Otsu's method or Li's method, resulting in binary image. A median filter was then applied to eliminate potential local irregularities, which could cause false branching point detection. From the binary images, the vascular density was quantified (calculated as the ratio of pixels associated with the vessels divided by the total number of pixels in the image). For the other parameters, a skeleton of the images was first computed using ImageJ, then the total vascular length was quantified using the Measure Skeleton Length plug-in from ImageJ. The number of branch points was extracted from the Analyze Skeleton plug-in of ImageJ. All results were transferred to Microsoft Office Excel software and automatically rearranged using a lab custom-made program. As all images generated at each step of the processing were saved, a visual control was made to ensure that there were no aberrant results.

Statistical analysis was performed with Prism 7 software (GraphPad). For most of the experiments, 1-way ANOVA was used for multiple comparisons. Results are expressed as mean±SEM. For post hoc pairwise, the Dunnett's test was used. A value of *$P<0.05$, $P<0.01$, *$P<0.001$ or ****$P<0.0001$ denotes statistical significance. An in-group variation of around 15% in parameters related to blood vessel architecture changes has been previously observed by the inventors, therefore a difference between controls and mutant mice of around 20-30% was anticipated. It was therefore expected that a group of 8 mice per condition would reveal statistical differences.

Mouse Endothelial Cell Isolation, Culture and Stimulation

Lungs from Engflox/flox pups were surgically removed, rinsed in ice-cold DMEM and endothelial cells were isolated as described in Galaris et al., (2021) "In vitro Three-Dimensional Sprouting Assay of Angiogenesis using Mouse Embryonic Stem Cells for Vascular Disease Modeling and Drug Testing" J Vis Exp (171). In summary, tissues were minced by the use of scissors, digested in DMEM-3 mg·ml-1 Collagenase A (10103586001, Roche) for 15 min at 37° C. and then filtered through a 70-µm strainer. The cell suspension was centrifuged at 200 g for 5 min and CD45+ cells were removed using Dynabeads sheep anti-Rat IgG (11035, Invitrogen) coated with rat anti-mouse CD45 antibody (550539, BD Pharmigen). Endothelial cells were sorted using Dynabeads sheep anti-Rat IgG (11035, Invitrogen) coated with rat anti-mouse PECAM1 antibody (550274, BD Pharmigen) according to the manufacturer's instructions. After washing 5 times with DMEM-0.1% BSA, cells were seeded in 6 well plates. Lung and liver ECs were maintained for two-three passages in Endothelial Cell Growth Medium 2 (C-22011, PromoCell) complemented with Fetal Calf Serum, Human Epidermal Growth Factors, Basic Fibroblast Growth Factor, Insulin like Growth Factor, Human Vascular Endothelial Growth Factor-165, Ascorbic acid, Heparin and Hydrocortisone (C-39211, SupplementPack EC GM2, PromoCell).

ECs were seeded in six-well plates and allowed to grow to 90% confluence. Cells were then washed with PBS and serum starved for six hours. Cells were treated for 1 h with VAD044 at 0.05, 0.1, 0.25, 0.5, 1.0, 5.0 or 10.0 mM in Endothelial Cell Growth Medium 2 (C-22011, PromoCell) before stimulation with VEGF-A (25 ng·ml-1) for 30 min. Cells were washed with cold PBS and then lysed in RIPA Buffer (50 mM Tris-HCl pH 7.4, 150 mM NaCl, 1 mM Ethylene diamine tetra-acetic acid (EDTA), 1% Triton X-100, 0.1% Sodium Dodecyl Sulfate (SDS), 0.5% deoxycholate) containing protease and phosphatase inhibitors (PPC1010, Sigma-Aldrich).

Adenoviral Infection

Lung or liver ECs were infected with an Adenovirus expressing the Cre-Recombinase (SL100707, SignaGen Laboratories) using a multiplicity of infection (m.o.i) of 500 for 6 hours, washed with PBS and then cultured in Endothelial Cell Growth Medium 2 for 12 to 60 hours before use.

Immunofluorescence Staining

Eyes were fixed in 4% paraformaldehyde (PFA) in PBS at room temperature for 10 min, retinas were dissected, post-fixed in 4% PFA in PBS at 4° C. overnight then processed for immunostaining. Retinas were permeabilized in PBS, 1% BSA and 0.5% Triton X-100 at 4° C. overnight, rinsed in PBS, washed twice in PBlec (PBS, pH 6.8, 1% Triton-X-100, 0.1 mM $CaCl_2$, 0.1 mM $MgCl_2$, 0.1 mM $MnCl_2$), and then incubated in biotinylated *Griffonia simplicifolia* lectin (isolectin B4) (B-1205, Vector Laboratories, 1:50) in PBlec at 4° C. overnight. After 5 washes in PBS, samples were incubated with streptavidin Cy-3 (PA43001, Sigma-Aldrich, 1:100) and with a-SMA (clone 1A4) (F3777, Sigma-Aldrich) conjugated with FITC diluted in PBS, 0.5% BSA, and 0.25% X-100 at 4° C. for 2 h. After washing, flat whole-mount retinas were mounted in DAKO medium (S3023, Dako). Complete high-resolution 3-dimensional rendering of whole-mount retinas was acquired using Laser Scanning Microscope SP5 or SP8 (Leica).

Western Blot and Quantification

Samples were boiled for 10 min and proteins were separated on 10% acrylamide gel and transferred onto nitrocellulose membrane before blocking with 5% BSA or 5% powdered milk/Tris-buffered saline/Tween and incubated with the following primary antibodies: rabbit anti-Phospho-Akt1 (Ser473) (44-621G, Invitrogen), rabbit anti-Akt1 (2938S, Cell Signaling), rabbit anti-PhosphoSmad1/5 (Ser463/465) (9516S, Cell Signaling), rabbit anti-Smad1 (6944S, Cell Signaling), mouse anti-Phospho-p44/42 MAPK (Thr202/Tyr204) (E10) (9106S, Cell signaling), rabbit p44/42 MAPK (Erk1/2) (9102S, Cell Signaling), goat anti-Endoglin (AF1097, R&D systems) and mouse anti-β-actin (A5441, Sigma-Aldrich). Detection was achieved using HRP anti-rabbit IgG or HRP anti-mouse IgG (W4011 or W4021 respectively, Promega) or HRP anti-goat IgG (HAF017, R&D systems) followed by scanning on BIO-RAD ChemiDoc imager. Images were captured in the linear range and ImageJ software was used for measuring protein and protein phosphorylation levels. For all blots, background was subtracted and results were normalized as indicated in the figures.

Pharmacokinetics (PK) Profile of VAD044 in Neonate Mice

VAD044 was formulated in sterile PBS and administered via the intra-peritoneal (i.p.) route at a dose concentration of 2.5 mg/kg and a dose volume of 10 µl/g in neonate mice at P3 and P5. Terminal blood samples collected at 24 h and 48 h post injections were collected from each mouse under isoflurane anaesthesia for the preparation of plasma. 4 neonate mice were used per time point in the study. Blood was collected into EDTA coated microvettes (Sartsed) for plasma preparation. Blood was centrifuged at 2700×g for 10 minutes and approximately 30 to 40 µl plasma was removed and aliquoted into polypropylene tubes (two aliquots per animal). Plasma samples were stored at −80° C. until bioanalysis. VAD044 compound levels in plasma samples was determined by LC-MS/MS. VAD044 plasma concentration at 24 h and 48 h allows calculation of the Cavg using the following formula: AUC0-inf/(interval number over 48 h).

Modelling of Human Dose

The human dose modelling analysis was performed using a non-linear mixed effects modeling approach with a qualified installation of MONOLIX (version 2019R1). R (Version 3.5.3) was used in the analysis for pre- and post-processing of data and model output. All PK raw data generated in mice, rats and dogs species used to build the models are summarized in Table 3 which gives an overview of the number of animals and the number of samples included in the overall analysis.

TABLE 3

Summary of available concentration observations for VAD044

| Data | N animals | N samples | N samples included in analysis |
|---|---|---|---|
| Mouse | 15 | 90 | 90 (100%) |
| Rat | 161 | 861 | 861 (100%) |
| Dog | 38 | 448 | 448 (100%) |
| TOTAL | 214 | 1399 | 1399 (100%) |

The PK parameters of the human model were determined based on allometric scaling of clearance and volume parameters with body weight. For bioavailability and absorption rate, assumptions had to be made. The absorption rate kabs was derived from the value in dog using allometric scaling with bodyweight with an exponent of −0.25. This exponent was observed before for other parameters associated with the same physical unit as kabs, 1/time, see Dawson TH. Allometric relations and scaling laws for the cardiovascular system of mammals. Systems. 2014 June; 2(2):168-85. The data in the current analysis did not allow to inform the bioavailability value in human. Therefore, a reasonable assumption had to be made and 50% bioavailability in human was assumed to be an adequately conservative estimate.

As discussed below, the blood exposure of VAD044 free base measured by LC/MS/MS bioanalysis at the dose of 2.5 mg·kg-1 in the plasma of mouse neonate corresponds to a Cavg of 22.9 ng/ml (or 55.1 nM) over 48 hours dosing interval. Based on PK modelling, this exposure is predicted to be achieved in humans with a single flat dose Q.D. of between 20 and 40 mg (of VAD044 free base). This dosing is calculated for a human adult of 70 kg and with a predicted bioavailability of VAD044 of between 50 and 75%.

Compounds Evaluated

Three compounds with different AKT kinase inhibitory properties were tested:
(i) Perifosine (comparative compound): an AKT inhibitor of the alkylphospholipid class. Unlike ATP binding kinase inhibitors, Perifosine targets the pleckstrin homology (PH) domain of AKT, thus preventing its translocation to the plasma membrane (Gradziel et al., (2014), "Cytotoxic amphiphiles and phosphoinositides bind to two discrete sites on the Akt1 PH domain", Biochemistry, https://doi.org/10.1021/bi401720v; Kondapaka et al., (2003), "Perifosine, a novel alkylphospholipid, inhibits protein kinase B activation", Molecular Cancer Therapeutics; Rios-Marco et al., (2017), "Alkylphospholipids: An update on molecular mechanisms and clinical relevance", In Biochimica et Biophysica Acta—Biomembranes, https://doi.org/10.1016/j.bbamem.2017.02.016))
(ii) Uprosertib (comparative compound): an ATP competitive inhibitor of AKT1, AKT2 and AKT3. It can also potentially inhibit PKC family members including PRKACA, PRKACB as well as the cGMP-dependent protein kinase PRKG1 and ROCK kinases (Dumble et al., (2014), "Discovery of novel AKT inhibitors with enhanced anti-tumor effects in combination with the MEK inhibitor", PLoS ONE. https://doi.org/10.1371/journal.pone.0100880)
(iii) VAD044 (compound of the present invention): a novel allosteric inhibitor of AKT1/2 with excellent selectivity against other kinases. As discussed above, VAD044 is the L-tartrate salt of the compound shown below (referred to as "VAD044 free base"):

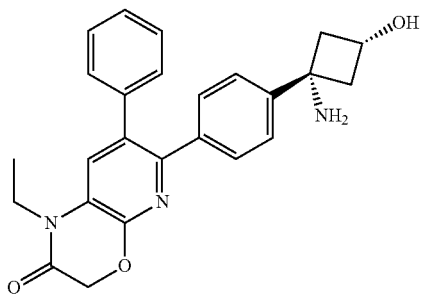 [SMILES: CCN1C(=O)COc2nc(-c3ccc([C@]4(N)C[C@@H](O)C4)cc3)c(-c3ccccc3)cc21]

Figure 3:
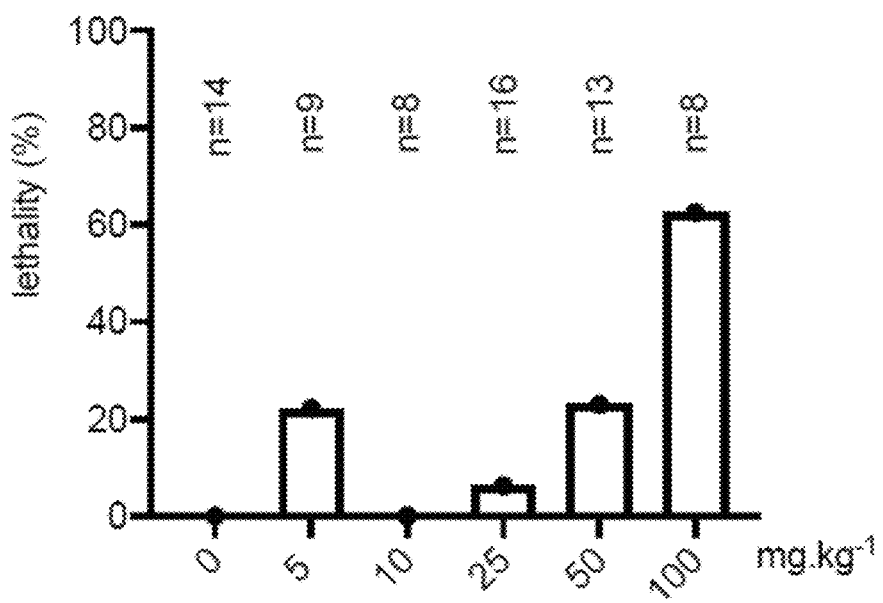
FIG. 3 shows the safety and potential toxicity of Perifosine.
Figure 3:
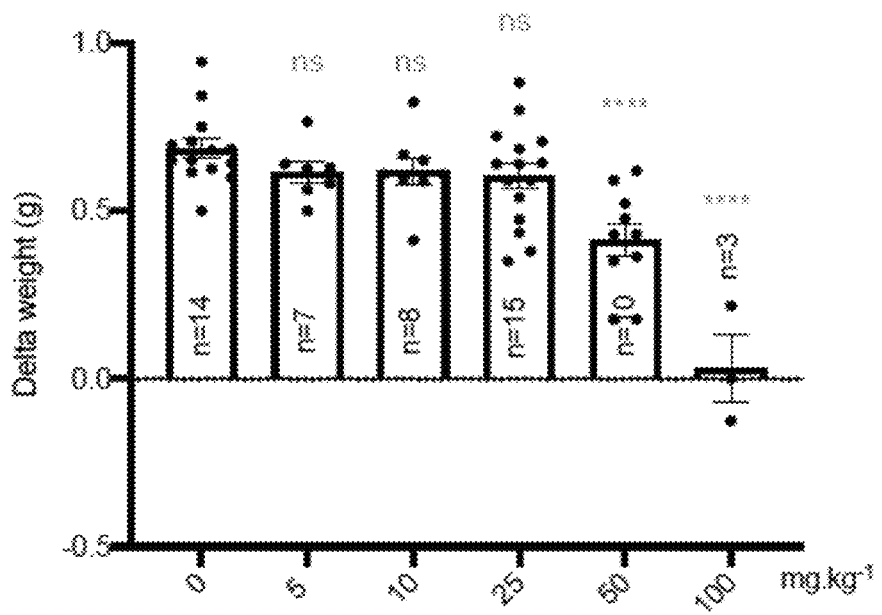
Figure 4A:
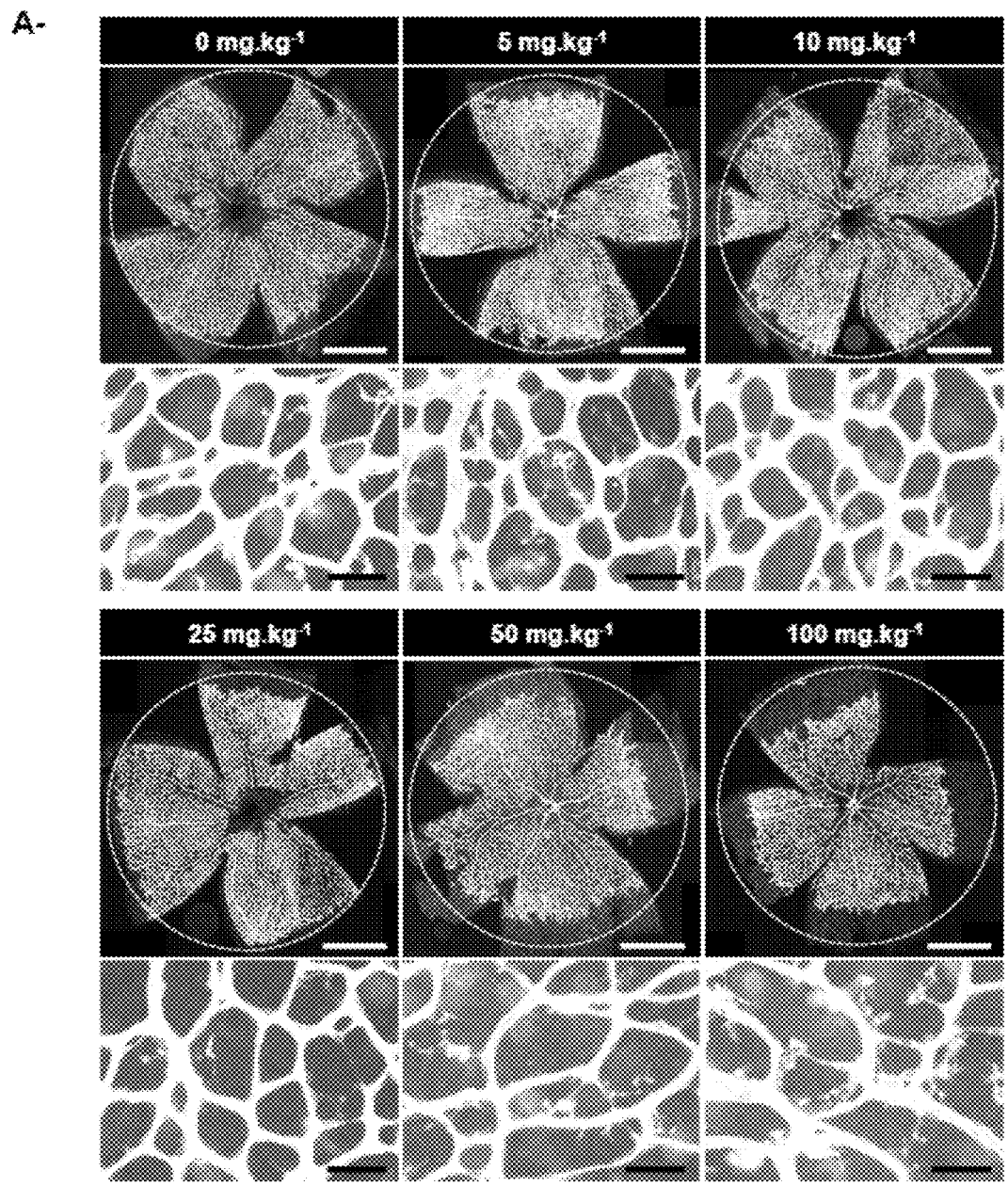
FIG. 4(A) shows isolectin B4-stained endothelial cells in retinal vessels in wild-type mice at P7 after intraperitoneal injection with vehicle alone or with 5, 10, 25, 50 or 100 mg·kg-1 of perifosine at P4. At bottom are higher magnifications of the vascular network.
Figures 4B, 4C, 4D:
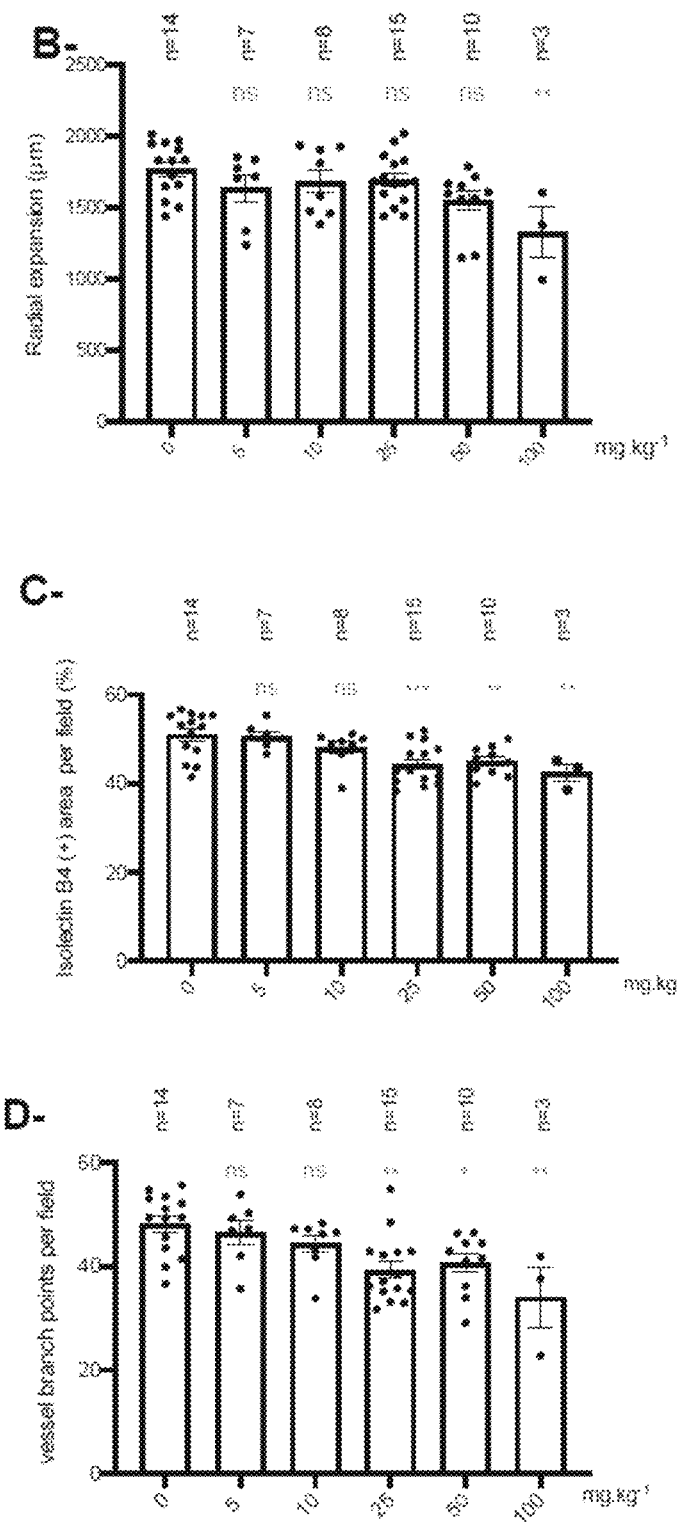
FIG. 4(B) shows quantification of the radial expansion
FIG. 4(C) shows the isolectin-B4-positive surface area.
FIG. 4(D) shows the number of branch points per field. All error bars represent S.E.M. *$p<0.05$ and **$p<0.01$ result from one way Anova and Dunnet's post hoc tests comparing the mean of each group to the control group treated with the vehicle alone. "ns"=non significant.

VAD044 free base
IUPAC name: 6-(4-(1-amino-3-hydroxycyclobutyl)phenyl)-1-ethyl-7-phenyl-1H-pyrido[2,3-b][1,4]oxazin-2(3H)-one Perifosine Profile Toxicity No adverse effects were observed in neonatal mice injected once with Perifosine at P4, at doses ranging from 5 to 25 mg·kg-1. Administration of Perifosine at 50 mg·kg-1 delayed weight gain, and administration of Perifosine at 100 mg·kg-1 induced important pup mortality (see FIG. 3). The safety profile of Perifosine is therefore satisfactory when compared to a drug such as Thalidomide that has previously been tested in neonatal mice and was reported to reduce the severity and frequency of nosebleeds in HHT patients (Lebrin et al., as above).

Anti-angiogenic properties in C57Bl/6J Mice

Low doses of Perifosine administered once at P4 (doses ranging from 5 to 10 mg·kg-1) did not affect angiogenesis (see FIGS. 4A-D). Only high doses of Perifosine ranging from 25 to 100 mg·kg-1 resulted in minor changes of the retinal vascular bed, with a slight reduction of the number of branch points and of the vascular area (see FIGS. 4A-D). Perifosine at 100 mg·kg-1 led also to reduced vascular radial expansion, revealing minor endothelial cell anti-migratory properties (see FIGS. 4A-B). In conclusion, Perifosine exhibits weak anti-angiogenic properties.

Ability to Precent AVM Formation in Eng-iKO Mice

Figures 5A, 5B:
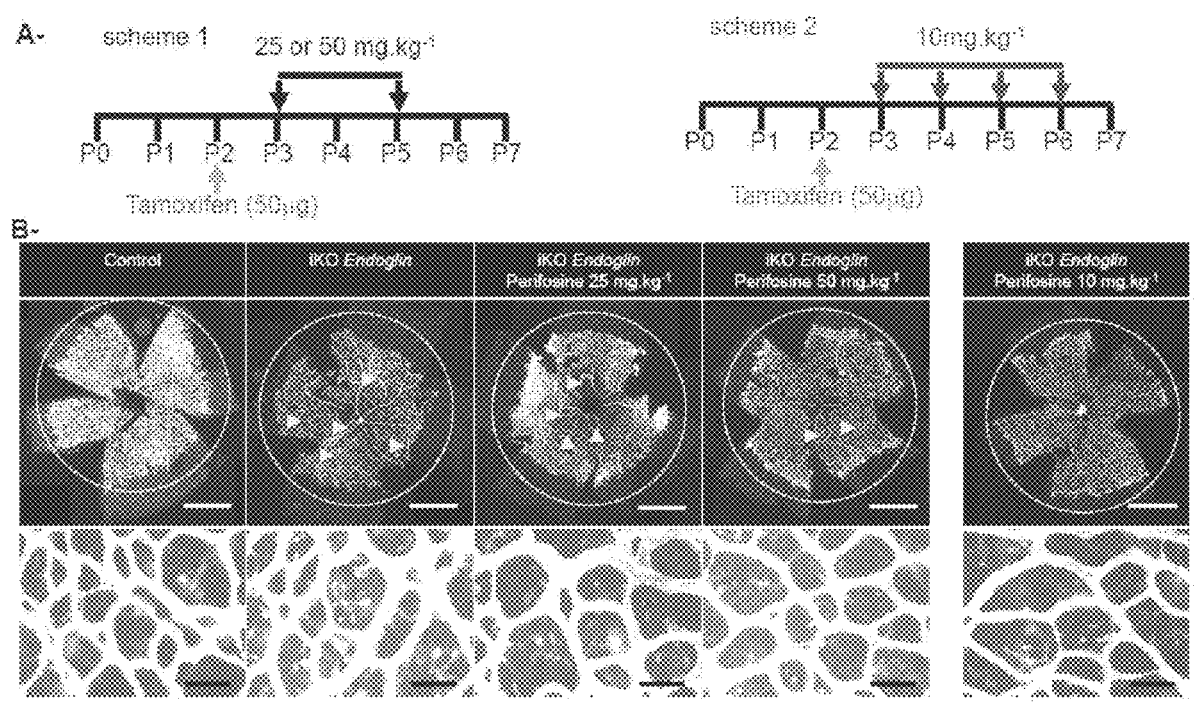
FIG. 5(A) is an illustration of the injection schemes of Perifosine.
FIG. 5(B) shows confocal images showing the effects of Perifosine on Eng-iKO retinas stained with isolectin-B4 to reveal endothelial cells. At bottom are higher magnifications of the vascular network.
Figures 5C, 5D, 5E, 5F:
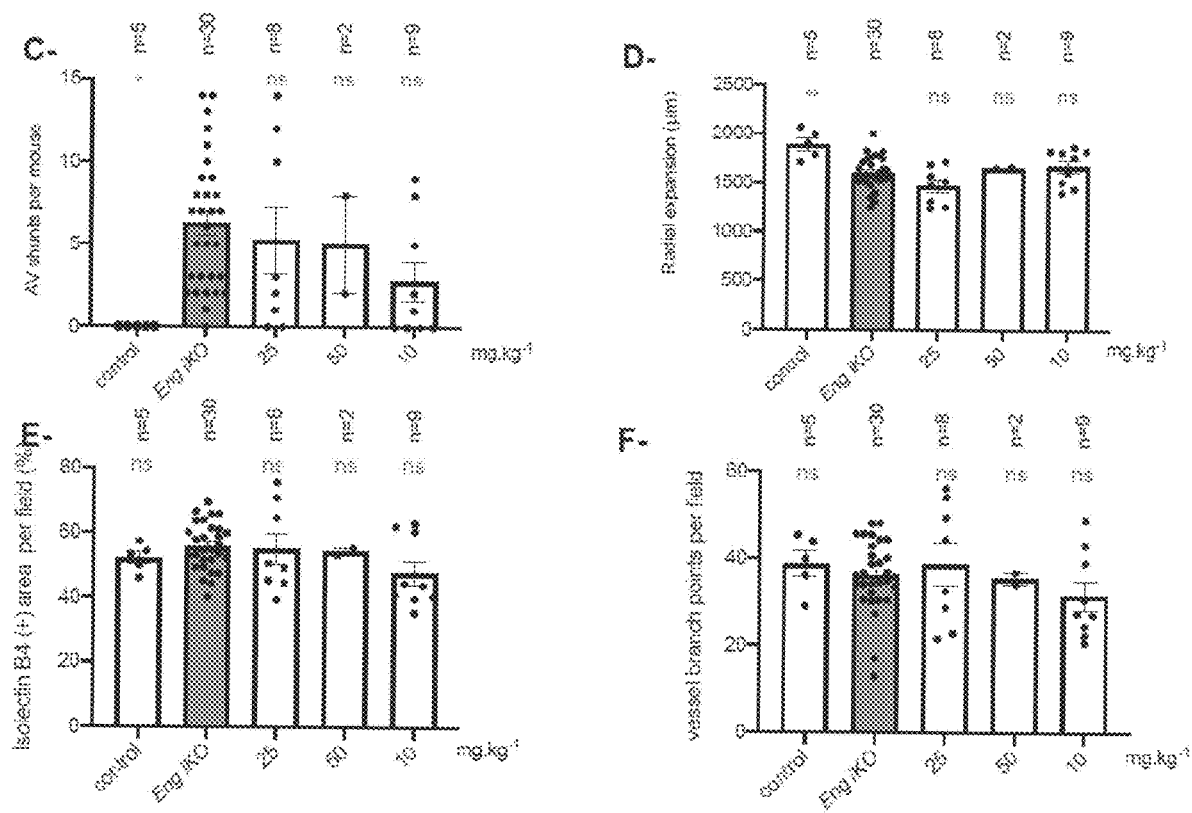
FIG. 5(C) shows the number of AV shunts per mouse.
FIG. 5(D) shows quantification of the radial expansion.
FIG. 5(E) shows the isolectin-B4-positive area.
FIG. 5(F) shows the number of branch points per field. All error bars represent S.E.M. *$p<0.05$ results from one way Anova and Dunnet's post hoc tests comparing the mean of each group to the Eng-iKO group. "ns"=non significant.

50 µg Tamoxifen was injected into P2 Eng-iKO mice. The mice were then administrated Perifosine intraperitoneally either at P3 and P5 (25 or 50 mg·kg-1 body weight, i.p) (FIG. 5A) or daily from P3 to P6 (10 mg·kg-1 body weight, i.p). Retinas were analyzed at P7 (FIG. 5A). Littermates injected with vehicle alone or with Tamoxifen and vehicle alone were used as controls. As expected conditional deletion of Eng at P2 resulted in retinal AVM formation (FIG. 5B) and a modest reduced vascular outgrowth (FIG. 3D). Perifosine was unable to prevent AVM formation in Eng-iKO mice (FIG. 5C) and did not inhibit angiogenesis (FIGS. 5D-E) at the doses and injection schemes tested (FIG. 5A-F). Moreover, daily intraperitoneal administration of Perifosine at 25 mg·kg-1 resulted in pup death (data not shown).

Uprosertib Profile

Toxicity

Figure 6:
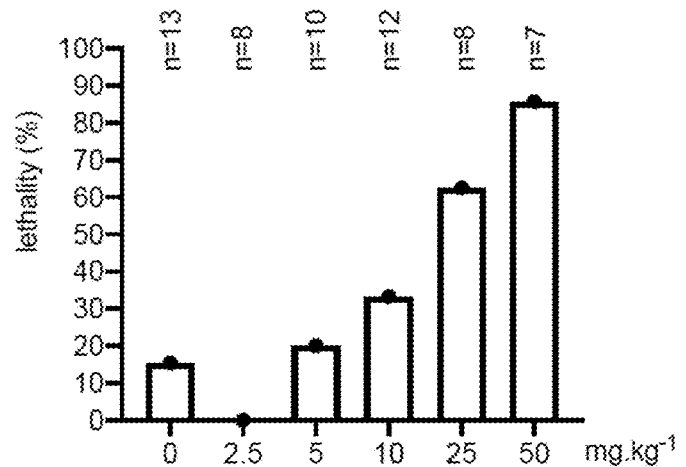
FIG. 6 shows the safety and potential toxicity of Uprosertib.
Figure 6:
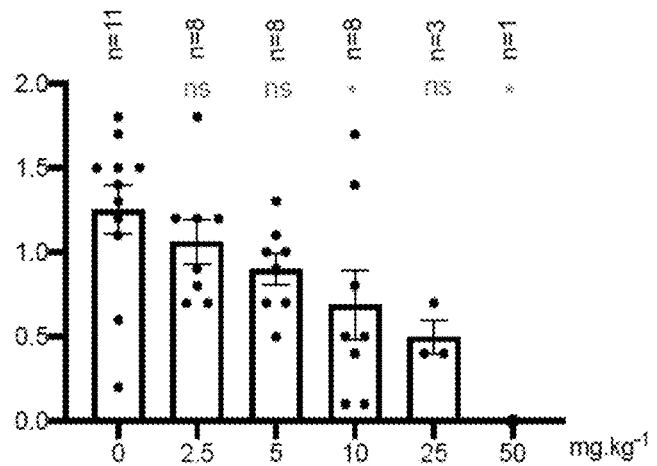

Uprosertib was found to be highly toxic, as evidenced by the pup viability and weight of wild-type mice observed at P4 to P7 following a single injection of Uprosertib at P4 (concentration ranging from 10 to 50 mg·kg$^{-1}$ bodyweight)—see FIGS. 6A-B. Doses of 1 to 5 mg·kg$^{-1}$ bodyweight administered to Eng-iKO mice were found to result in death of the majority of the pups.

Anti-Angiogenic Properties in C57Bl/6J Mice

Figures 7A, 7B:
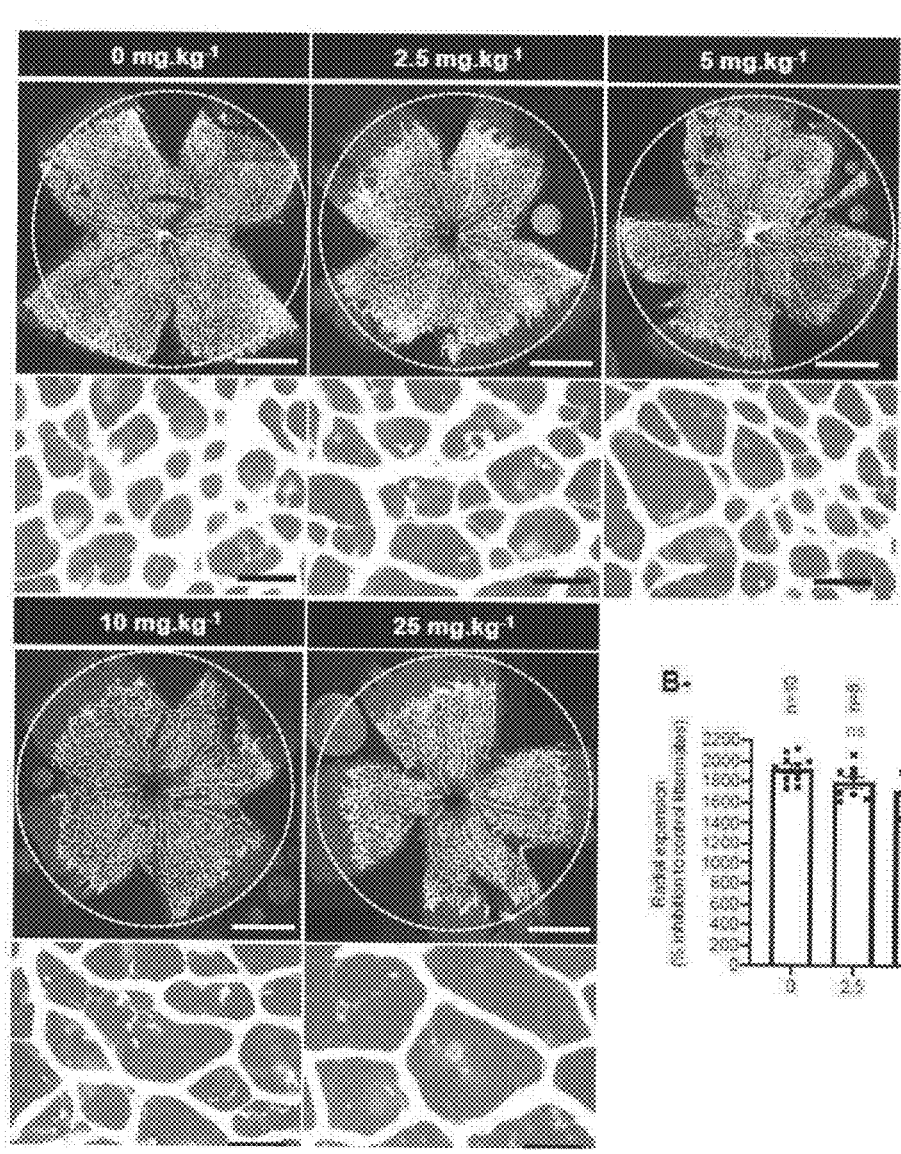
FIG. 7(A) shows isolectin B4-stained endothelial cells in retinal vessels in wild-type mice at P7 after intraperitoneal injection with vehicle alone or with 2.5, 5, 10, 25 mg·kg-1 of perifosine at P4. At bottom are higher magnifications of the vascular network.
FIG. 7(B) shows quantification of the radial expansion.
Figures 7C, 7D:
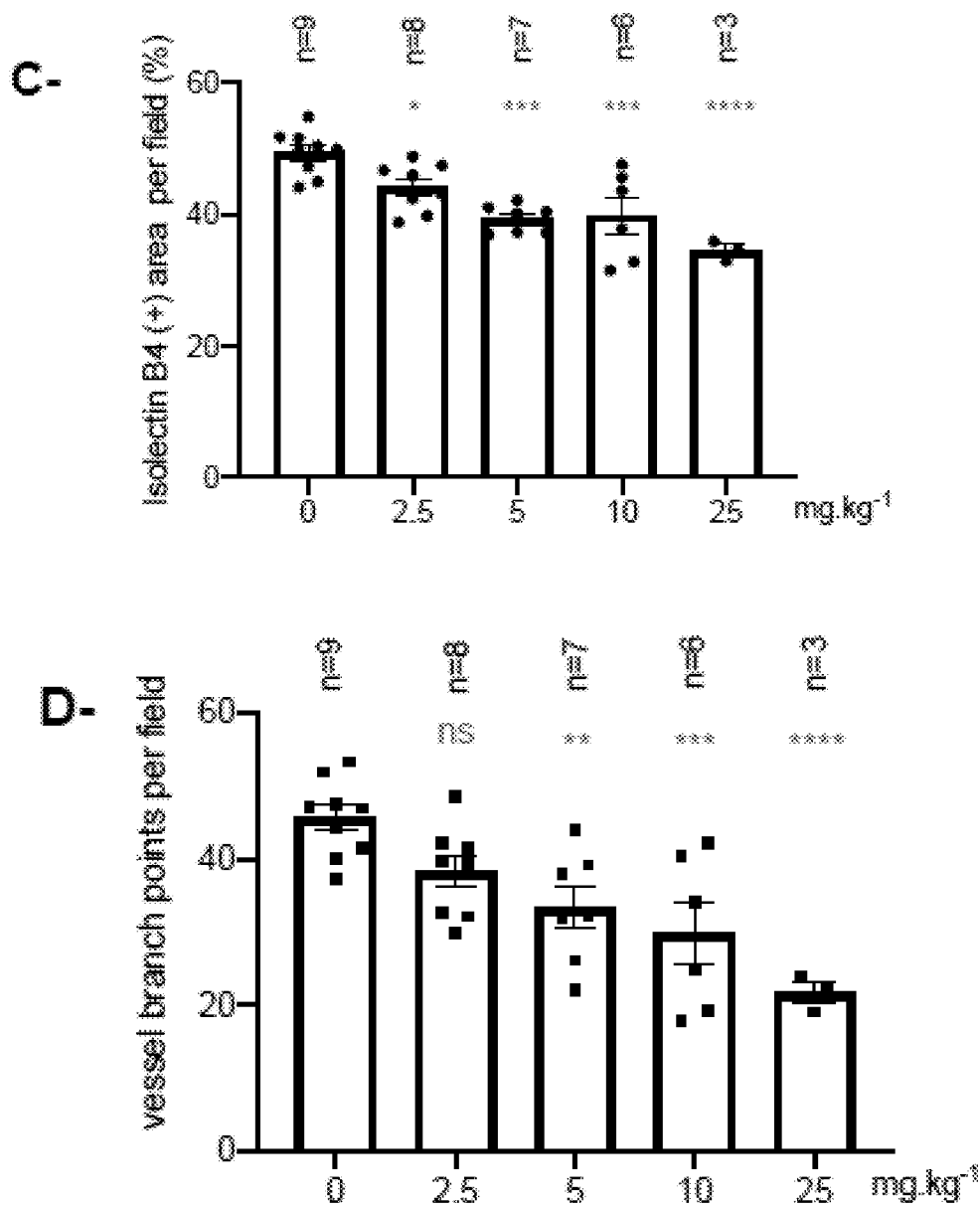
FIG. 7(C) shows the isolectin-B4-positive surface area.
FIG. 7(D) shows the number of branch points per field. All error bars represent S.E.M. *$p<0.0$, $p<0.01$, *$p<0.001$ and ****$p<0.0001$ result from one way Anova and Dunnet's post hoc tests comparing the mean of each group to the control group treated with the vehicle alone. "ns"=non significant.

Even at low doses administered once at P4 (5 to 25 mg·kg-1, i.p), Uprosertib inhibited angiogenesis with a slight decrease in the radial expansion (FIG. 7B); and a marked decrease in the vascular area (FIG. 7C) and in the number of branch points (FIG. 7D), suggesting endothelial cell antiproliferative effects. These results show that Uprosertib is a potent inhibitor of angiogenesis in mouse retinas.

Ability to Precent AVM Formation in Eng-iKO Mice

Figure 8:
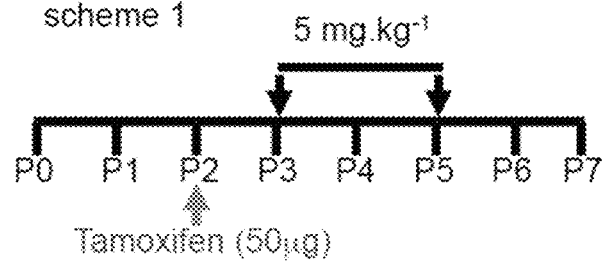
FIG. 8(A) is an illustration of the injection schemes of Uprosertib.
FIG. 8(B) shows pup lethality. EngFlox/flox; cdh5-CreERT2 animal were injected with tamoxifen (50 μg) at P2 to induce nearly complete gene knockout in neonatal mice followed by IP injection of 0 or 5 mg·kg-1 bodyweight of Uprosertib once at P3 and P5. The same volume of vehicle was injected serving as control animals.
Figure 8:
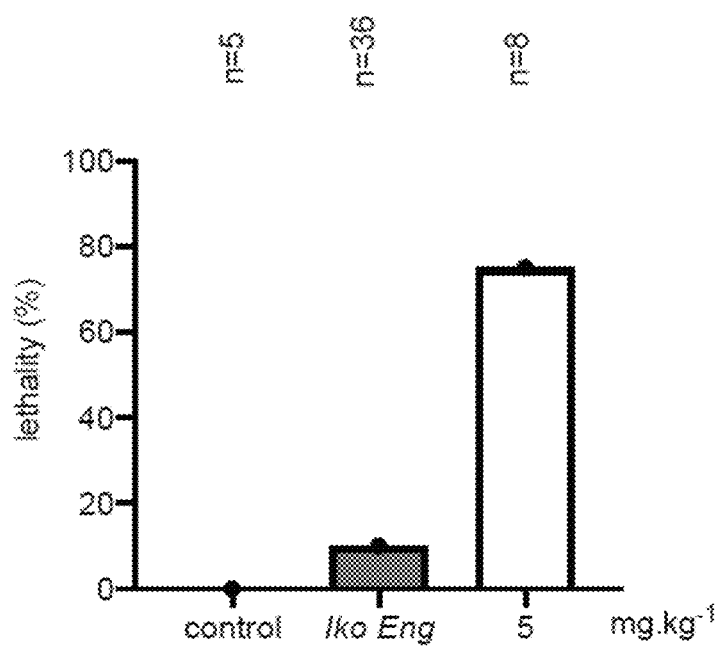

Eng-iKO mice were injected twice with Uprosertib at P3 and P5 (FIG. 8A). However, it was found that two injections of Uprosertib resulted in the death of the majority of the pups (FIG. 8B), preventing further investigation of the ability of Uprosertib to prevent AVM formation in mice at the doses tested.

VAD044 Profile

The compound VAD044 has already been shown to have a good safety profile in previous preclinical studies in tumor xenograft models, therefore no additional safety/toxicity studies were performed.

Ability to Prevent AVM Formation in Eng-iKO Mice

Figure 9:
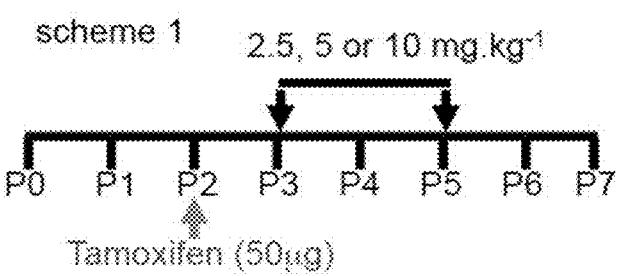
FIG. 9(A) is an illustration of the injection schemes of VAD044.
FIG. 9(B) shows pup lethality. The EngFlox/flox; cdh5-CreERT2 animal were injected with tamoxifen (50 μg) at P2 to induce nearly complete gene knockout in neonatal mice followed by IP injection of 0, 2.5, 5 or 10 mg·kg-1 bodyweight of VAD044 once at P3 and P5. The same volume of vehicle was injected serving as control animals. Mice were then killed at P7 and retinas processed for immunofluorescence staining as described (Lebrin et al., 2010).
Figure 9:
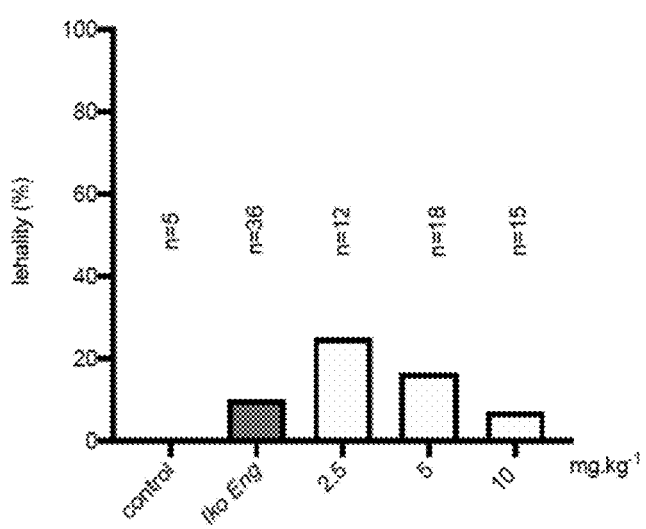
Figure 10A:
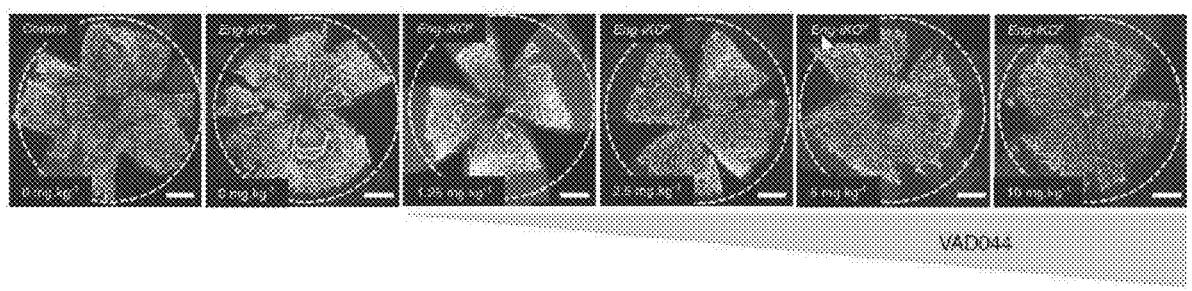
FIG. 10(A) shows confocal images showing the effects of VAD044 on Eng-iKO retinas stained with isolectin-B4 to reveal endothelial cells.
Figures 10B, 10C, 10D, 10E:
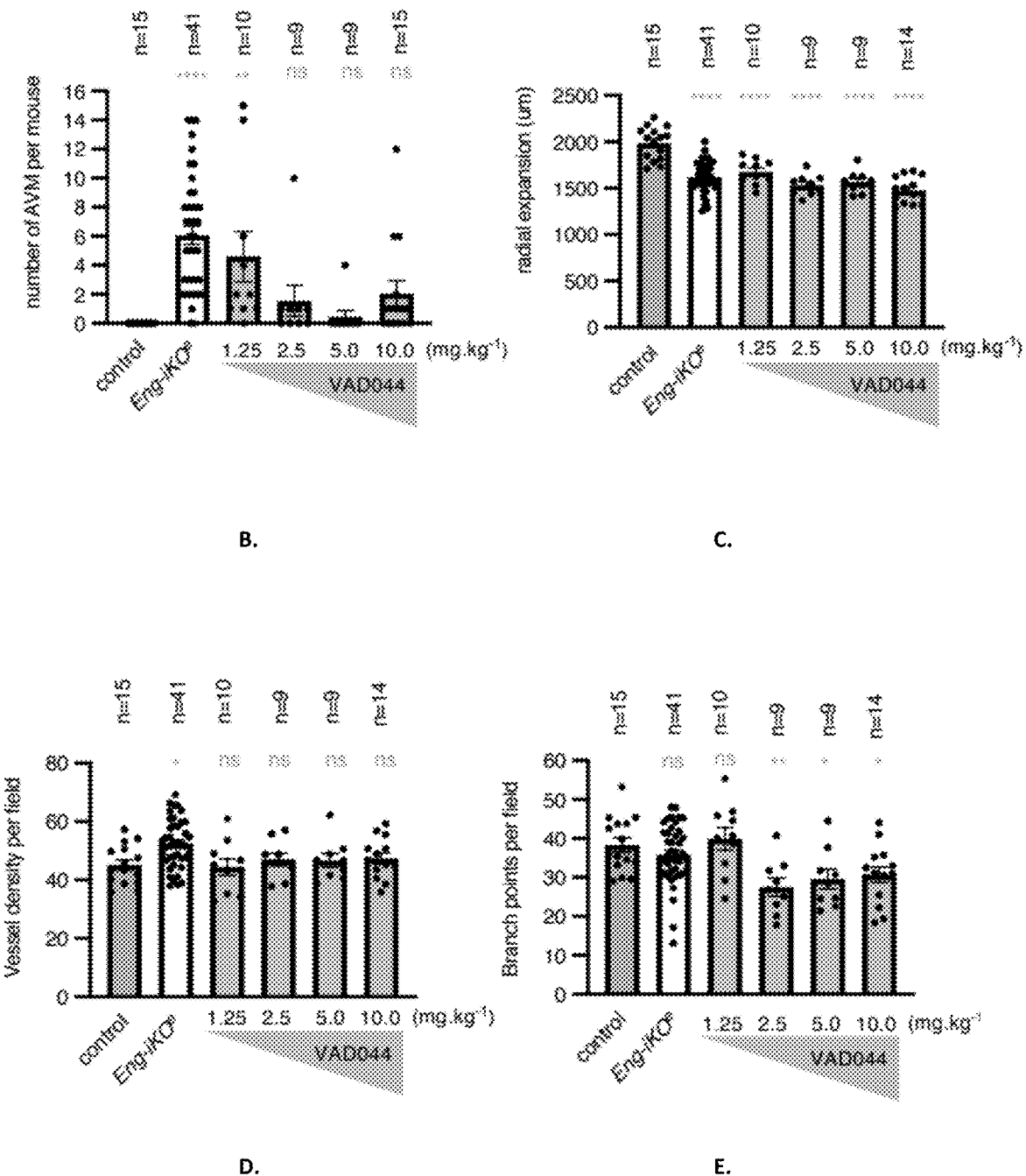
FIG. 10(B) shows the number of AV shunts per mouse.
FIG. 10(C) shows quantification of the radial expansion.
FIG. 10(D) shows the isolectin-B4-positive area.
FIG. 10(E) shows the number of branch points per field. All error bars represent S.E.M. *$p<0.05$, $p<0.01$ and *$p<0.001$ result from one way Anova and Dunnet's post hoc tests comparing the mean of each group to the Eng-iKO group. "ns"=non significant.
Figure 11:
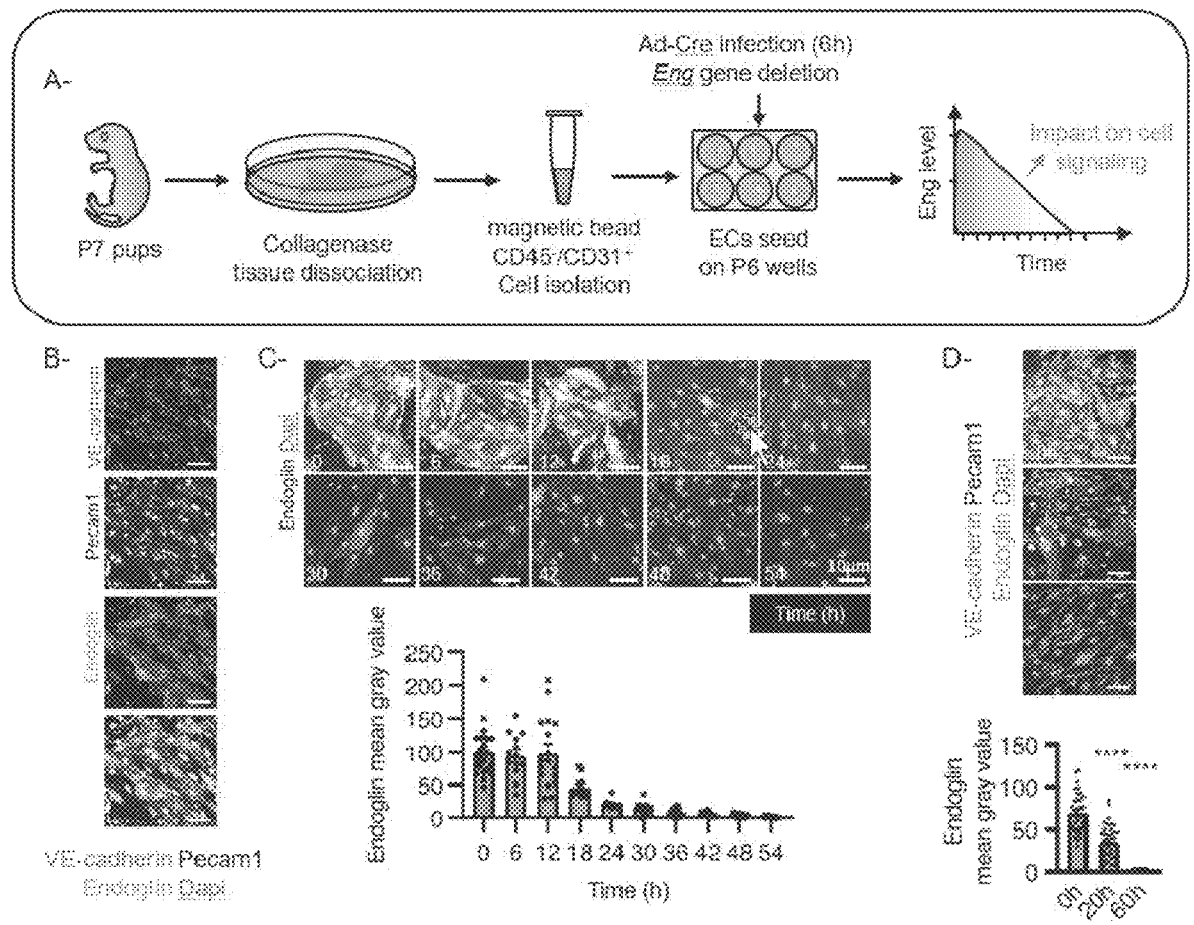
FIG. 11 shows the method for isolation and characterization of primary mouse endothelial cells from the lungs of Eng-iKO mice, and adenoviral infection of Cre recombinase to induce deletion of the Eng gene (and the subsequent deletion of Eng protein) in the cells.

The concentrations tested were comparable to those used for Uprosertib (FIG. 9A). At these concentrations, no adverse effects were observed when neonatal Eng-iKO mice were injected twice with VAD044—at P3 and P5—with drug concentrations ranging from 1.25 to 10 mg·kg-1 bodyweight (FIG. 9B). VAD044 efficiently prevented AV shunt formation in Eng-iKO mice at the concentrations of 2.5 mg·kg-1 and above (FIG. 10A-B). The dose of 1.25 mg·kg-1 was found not to be effective in preventing AV shunt formation (FIG. 10A-B). VAD044 was also able to normalize the density of the retinal vascular network of the Eng-iKO mice (FIG. 10D) with minor effects on angiogenesis, slightly reducing the radial expansion (FIG. 10C) and the number of branch points of the Eng-iKO vascular network (FIG. 10E). The blood exposure of VAD044 free base measured by LC/MS/MS bioanalysis at the dose of 2.5 mg·kg-1 in the plasma of mouse neonate corresponds to a Cavg of 22.9 ng/ml (or 55.1 nM) over 48 hours dosing interval Endoglin Protein Deletion in Primary Mouse Endothelial Cells Preferentially Induced AKT Activation Primary endothelial cells were isolated from the lungs of Engflox/flox pups at postnatal day 7 (P7) using collagenase I-based enzymatic digestion followed by cell sorting with PECAM1-coated microbeads (FIG. 11A). CD45-coated microbeads were used to deplete the CD45+/PECAM1+ immune cell population (FIG. 11A). The isolated CD45-/PECAM1+ cell populations resembled that of endothelial cells and could be cultured for at least three passages. PECAM1 and VE-cadherin staining confirmed the endothelial cell identity (FIG. 11B).

Taking advantage of the Cre-Lox system, primary endothelial cell cultures were infected by recombinant adenoviruses encoding the Cre recombinase to excise the Eng gene. Adenoviral infection was highly efficient and had no effect on cell viability. Almost all cells underwent gene recombination within the first 10 hours and as endoglin is a relatively stable protein with a half-life estimated as around 17 hours, homogeneous endothelial cell cultures were obtained within the first 60 hours after infection with endoglin levels ranging from normal and half reduced to complete loss as shown by staining and western blot analyses (FIG. 11C-D).

Figure 12:
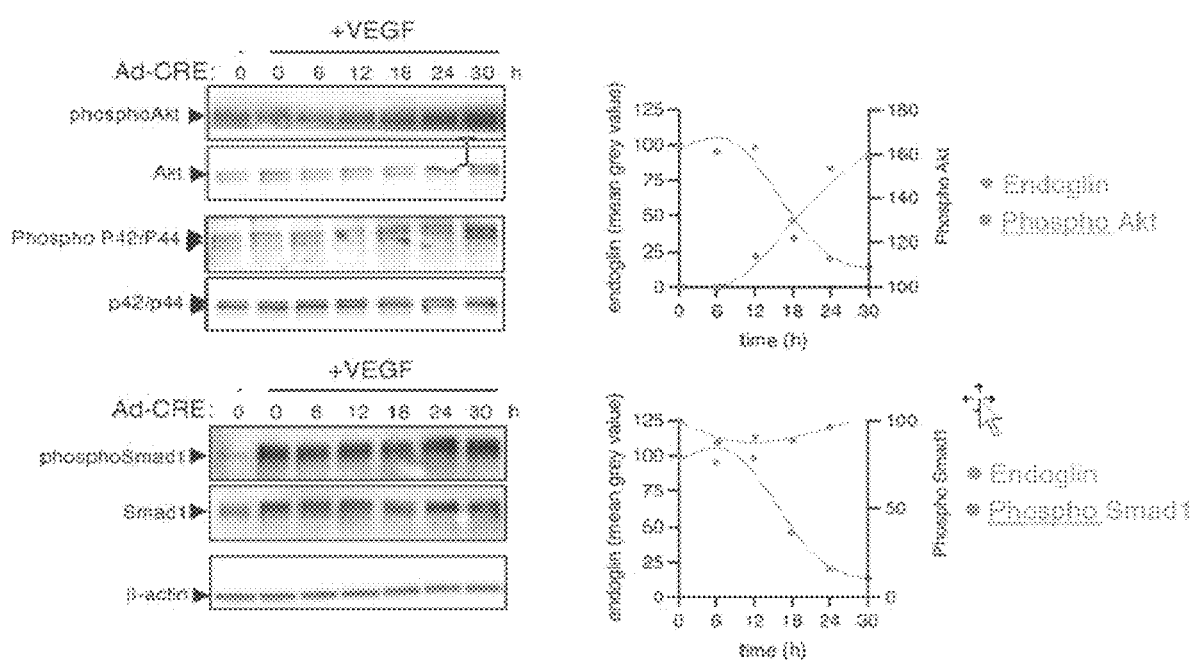
FIG. 12 shows the AKT and SMAD signalling in normal and Eng-deleted endothelial cells (ECs).

Activation of Akt and Smad1 signalling pathways in lung endothelial cells depleted in Eng protein expression was then investigated. Cells were treated with VEGF, TGF-β1 and BMP9 for 30 min at different time after infection that corresponded to different levels of endoglin expression. As previously published by Jakobsson's lab (Jin et al., 2017—as above), we were able to confirm that Endoglin protein expression decrease is associated with an increase in Akt phosphorylation (FIG. 12A). Most interestingly, AKT phosphorylation is more sensitive to Eng protein decrease, as a reduction by 50% of Eng protein induces an increase in Akt phosphorylation compared to endothelial cells expressing normal levels of endoglin (FIG. 12A) while Smad1 phosphorylation is unchanged (FIG. 12B). This result suggests that a reduction of endoglin expression by half induces an increased VEGF response and increased AKT signaling (increasing proliferation and migration, and contributing to vascular malformation), while classical BMP/SMAD signalling remains normal.

Measurement of VAD044 IC50 in Control and Eng-iKO Mouse Endothelial Cells

Figure 13:
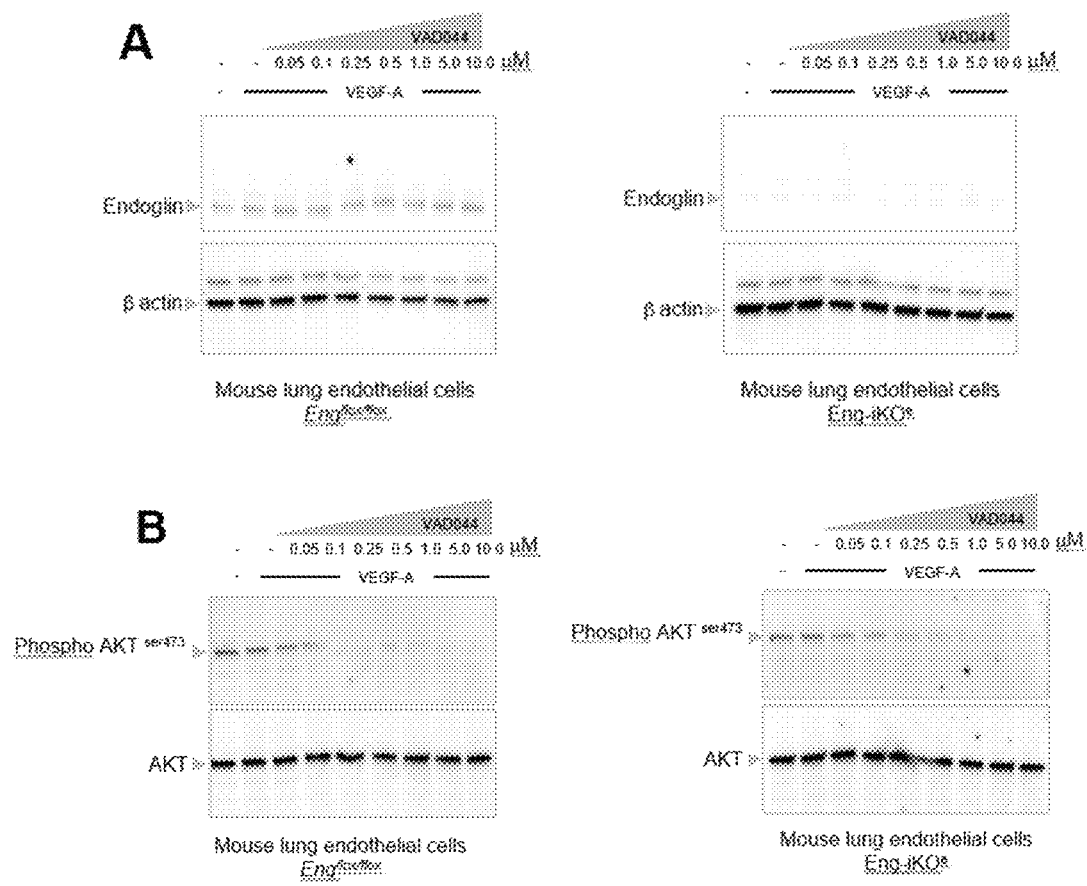
FIG. 13A shows the effect of Cre adenoviral infection on endoglin expression in normal and Eng-iKO ECs.
FIG. 13B shows the IC50 of VAD-044 in mouse lung endothelial cells with normal level of Eng expression, and in lung mouse lung endothelial cells displaying a complete loss of Eng expression.
FIG. 13C shows p42/p44 phosphorylation, which was analyzed as a control for selectivity.
Figure 13:
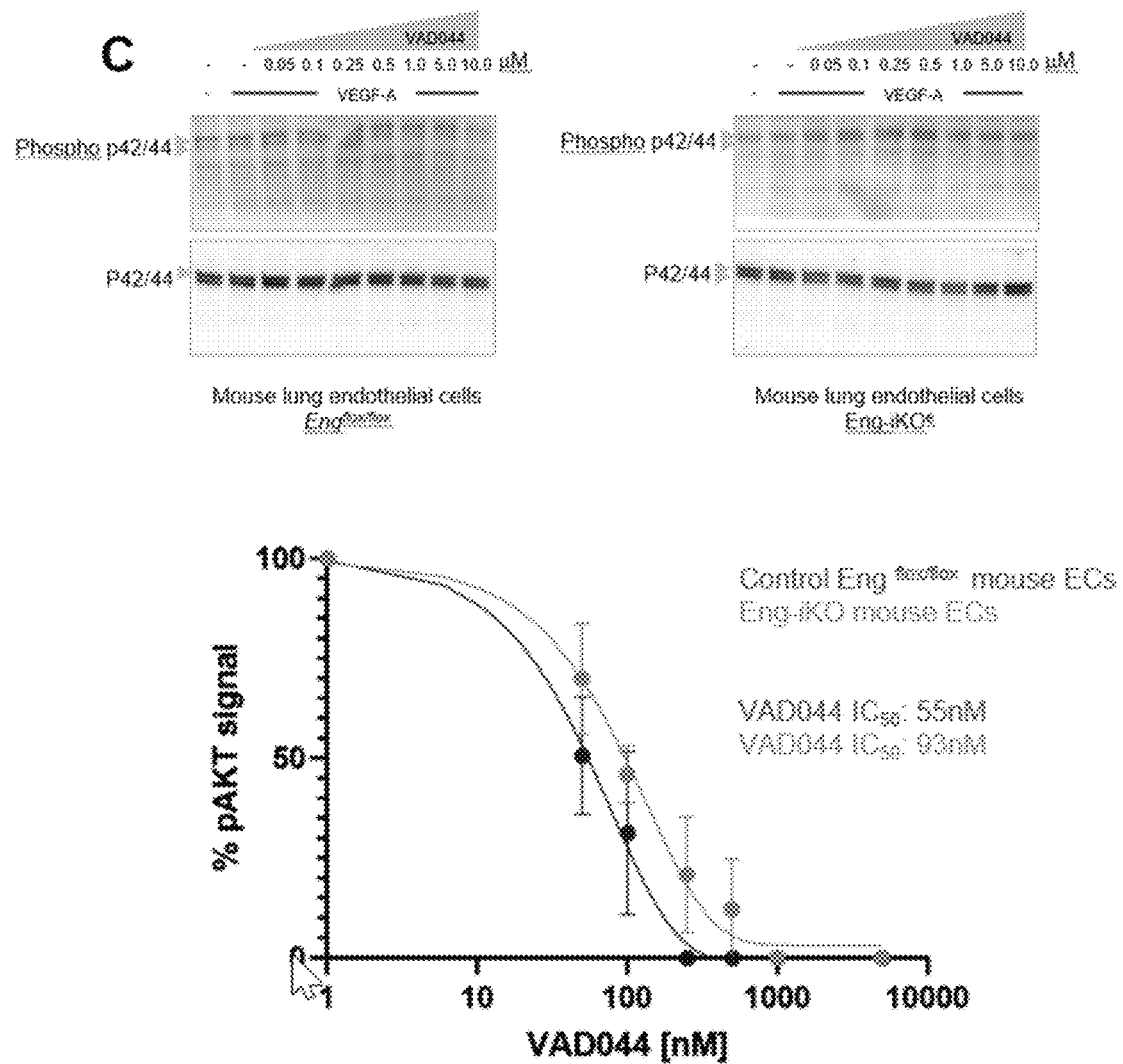

The effect of VAD044 on isolated primary lung endothelial cells from Eng-iKO mice was then tested. As expected, Cre adenoviral infection resulted in a complete loss of endoglin expression after 60 hours (FIG. 13A). ECs from controls with normal level of Eng expression were highly sensitive to VAD044 with IC50 measured at 55 nM, while the IC50 of VAD044 in lung mouse endothelial cells displaying a complete loss of Eng expression was 93 nM (FIG. 13B). This IC50 shift of ~2-fold can be explained by the increase in AKT activation (~2-4-fold) when Eng protein is fully knockdown (FIG. 12A). In parallel, p42/p44 phosphorylation was analyzed as a control for selectivity, and it was confirmed that VAD044 had no impact on the MAPK pathway (FIG. 13C).

Results/Discussion

Uprosertib is a competitive AKT inhibitor which binds to the ATP kinase binding pocket of AKT1, 2 and 3 isoforms. This compound is a typical low molecular weight scaffold with potent pan ATP kinase pocket inhibition (Dumble et al., 2014). However, there is a high degree of homology in the ATP binding pocket between AKT and protein kinase A (PKA), protein kinase C (PKC) or protein kinase G (PKG). Uprosertib thus displays strong inhibition over PKA, PKG, PKC as well as ROCK kinases. This "off-target" kinase activity is often associated with increased side effects (Rodon et al., (2013), "Development of PI3K inhibitors: Lessons learned from early clinical trials", Nature Reviews Clinical Oncology, https://doi.org/10.1038/nrclinonc.2013.10).

In contrast, allosteric inhibitors appear to have higher specificity for AKT. For example, VAD044 is a new AKT allosteric inhibitor, which offers one of the greatest selectivity profiles in this class of inhibitors with strong potency over AKT1 and 2 (US922183882). Perifosine is an unusual allosteric inhibitor that targets the pleckstrin homology domain of AKT, thereby preventing its translocation to the plasma membrane required for activation.

The biochemical and cellular potency of VAD044 on AKT kinase inhibition is comparable with that of Uprosertib. For instance, Uprosertib and VAD044 show an $IC_{50}$ on AKT1 of 180 and 125 nM respectively, based on a similar biochemical kinase activity assay (see Pachl, et al (2013). "Characterization of a chemical affinity probe targeting Akt kinases", Journal of Proteome Research, https://doi.org/10.1021/pr400455j; and Example 3 above re VAD044). Similarly, both molecules display a comparable $IC_{50}$ range for AKT kinase inhibition in Pi3Kα or PTEN mutant cells lines (e.g. MCF7, BT474 or LnCAP) comprised between 34 to 143 nM for Uprosertib and 50 to 130 nM for VAD044. In contrast, Perifosine has weaker potency than both VAD044 and Uprosertib, with cellular inhibitory activity on AKT on similar cell line being in the uM range (Gradziel et al., 2014; Kondapaka et al., 2003; Rios-Marco et al., 2017—as above).

The above results show that it was not possible to identify a therapeutic dosage window for Perifosine and Uprosertib having both acceptable safety and desirable inhibitory efficacy. For perifosine, even at high dosages where full inhibition of AKT kinases might be expected, the effect on normal angiogenesis and AVM shunt were only modest. At the highest dose that could be tolerated (25 and 50 mg·kg-1), no significant effects were observed in shunt formation in the HHT1 mouse model. When injected every day at 10 mg·kg- 1, a trend for efficacy was observed but statistical significance was not achieved. In contrast, Uprosertib displayed potent antiangiogenic properties when injected once at P3. A dose of 5 mg·kg$^{-1}$ was well tolerated and was selected for the efficacy study. However, when injected twice at P3 and P6, the 5 mg·kg$^{-1}$ dose resulted in high levels of pups mortality, and thus precluded any further assessment of its efficacy in preventing AVM shunt formation. This may be due to the off-target inhibitory effect of Uprosertib on PKA, PKG and ROCK kinases that may be involved in pup development between P3 and P7 (Shi et al., (2011), "Rho-kinase in development and heart failure: Insights from genetic models", Pediatric Cardiology. https://doi.org/10.1007/s00246-011-9920-0).

At a similar dose of 5 mg·kg$^{-1}$, two injections of VAD044 were well tolerated with no observed lethality. At 2.5 mg·kg$^{-1}$ VAD044 was able to fully prevent AVM shunt formation. Surprisingly, this dose has little or no impact on normal angiogenesis while being fully effective in preventing shunt formation.

This result suggests that VAD044 may be able to treat the vascular defects observed in HHT by a mechanism of AKT pathway inhibition. It also suggests that a partial pathway inhibition could be sufficient to treat vascular defects observed in HHT. Firstly, the above results confirm that Eng deletion in endothelial cells preferentially overactivates AKT signalling by 2 to 4 fold, while SMAD signalling remains normal. The minimal effective dose of 2.5 mg·kg-1 as identified in the results abovecorresponds to a blood exposure of VAD044 free base Cavg of 22.9 ng/ml (or 55.1 nM). This concentration is low and is equivalent to the IC50 of VAD044 for AKT inhibition in normal endothelial cells, and to the IC30-40 of VAD044 for AKT inhibition in endothelial cells deleted for the Eng protein. Surprisingly, the minimal effective dose of VAD044 in the HHT model is much lower than in Oncology indications. Although the IC50 of VAD044 in MCF7 tumor cells in vitro is similar (~50 nM), the minimal effective dose in vivo in a tumor xenograft model is 30 mg·kg$^{-1}$ i.e. about 10 times higher than in the HHT1 mouse model above. Based on different PK modelling, this effective concentration, corresponding to a Cavg of 22.9 mg/mL, is predicted to be achieved in humans with a single flat dose Q.D. of between 20 to 40 mg (of VAD044 free base). This dosing is calculated for a human adult of 70 kg and with a predicted bioavailability of VAD044 of between 50 to 75%.

Overall, these results suggest that the vasculature and endothelial cells carrying HHT genes deletion are very sensitive to AKT inhibition. Low doses of VAD044 could thus be efficacious in controlling vascular malformation when the pathway is overactivated, possibly due to suppression of BMP9 signaling as observed in HHT but also due to gain of function mutation, as observed in overgrowth syndrome or venous malformation resulting from somatic mutation PI3Kalpha or TIE2 (Castillo et al., (2016), "Phosphoinositide 3-kinase: a new kid on the block in vascular anomalies", Journal of Pathology (Vol. 240, Issue 4, pp. 387-396). John Wiley and Sons Ltd. https://doi.org/10.1002/path.4802).

The invention claimed is:

1. A method of treating Hereditary Hemorrhagic Telangiectasia (HHT) in a subject in need thereof, the method comprising administering to the subject a therapeutically effective amount of a compound of formula (I) or a pharmaceutically acceptable salt thereof

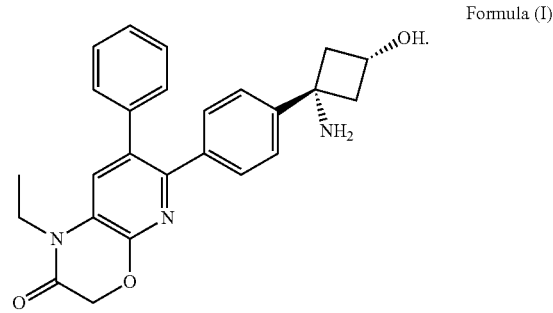 [SMILES: CCN1C(=O)COc2nc(-c3ccc([C@]4(N)C[C@@H](O)C4)cc3)c(-c3ccccc3)cc21]

Formula (I)

2. The method of claim 1, wherein the pharmaceutically acceptable salt is a tartrate salt, a mesylate salt, or a phosphate salt.

3. The method of claim 2, wherein the pharmaceutically acceptable salt is a tartrate salt.

4. The method of claim 3, wherein the tartrate salt is the L-tartrate salt.

5. The method of claim 1, wherein the compound is orally administered.

6. The method of claim 1, wherein the subject is a human.

7. The method of claim 6, wherein the subject is an adult.

8. The method of claim 7, wherein 20 mg to 75 mg of the compound is administered to the subject once a day.

9. The method of claim 7, wherein 10 mg to 50 mg of the compound is administered to the subject once a day.

10. The method of claim 9, wherein 20 mg to 40 mg of the compound is administered to the subject once a day.

11. The method of claim 10, wherein 20 mg to 30 mg of the compound is administered to the subject once a day.

12. The method of claim 1, wherein the administration provides a reduction in the frequency, duration or intensity of bleeding associated with HHT.

13. The method of claim 12, wherein the administration provides a reduction in the subject's gastrointestinal (GI) bleeding associated with HHT.

14. The method of claim 12, wherein the administration provides a reduction in the subject's epistaxis associated with HHT.

15. The method of claim 1, wherein the administration provides an increase in the subject's hemoglobin levels.

16. The method of claim 1, wherein the administration provides a reduction of the the number of the subject's telangiectasia.

17. The method of claim 1, wherein the administration provides a reduction of the size of the subject's telangiectasia.

18. The method of claim 16, wherein the telangiectasia is skin telangiectasia.

19. The method of claim 16, wherein the telangiectasia is nasal telangiectasia.

20. The method of claim 16, wherein the telangiectasia is oral telangiectasia.

21. The method of claim 16, wherein the telangiectasia is gastrointestinal telangiectasia.

22. The method of claim 1, wherein the administration provides a reduction of the number of the subject's arteriovenous malformations (AVMs).

23. The method of claim 22, wherein the administration provides a reduction of the size of the subject's arteriovenous malformations (AVMs).

24. The method of claim 23, wherein the administration prevents the formation of arteriovenous malformations (AVMs) in the subject.

25. The method of claim 22, wherein the arteriovenous malformations are pulmonary AVMs.

26. The method of claim 22, wherein the arteriovenous malformations are cerebral AVMs.

27. The method of claim 22, wherein the arteriovenous malformations are visceral AVMs.

28. The method of claim 1, wherein the administration prevents the subject's right to left shunt induced by pulmonary AVMs.

29. The method of claim 1, wherein the administration provides a reduction of the subject's grade of right to left shunt induced by pulmonary AVMs.

30. The method of claim 1, wherein the administration provides a reduction of the subject's need for iron supplementation.

31. The method of claim 1, wherein the administration provides a reduction of the number of blood transfusions required by the subject.

32. The method of claim 1, wherein the administration provides a decrease of the subject's hepatic blood flow.

33. The method of claim 1, wherein the administration reduces the subject's need for liver transplantation.

34. The method of claim 9, wherein 30 mg of the compound is administered once a day.

35. The method of claim 9, wherein 40 mg of the compound is administered once a day.

36. The method of claim 9, wherein 50 mg of the compound is administered once a day.

* * * * *

UNITED STATES PATENT AND TRADEMARK OFFICE
CERTIFICATE OF CORRECTION

| | | |
|---|---|---|
| PATENT NO. | : 12,466,839 B2 | |
| APPLICATION NO. | : 18/247261 | |
| DATED | : November 11, 2025 | |
| INVENTOR(S) | : Damien Picard et al. | |

It is certified that error appears in the above-identified patent and that said Letters Patent is hereby corrected as shown below:

In the Claims

In Claim 15:
At Column 30, Line number 43:
"The method of claim 1, wherein the administration"
Should read:
-- The method of claim 11, wherein the administration --

In Claim 16:
At Column 30, Line number 45:
"The method of claim 1, wherein the administration"
Should read:
-- The method of claim 11, wherein the administration --

In Claim 16:
At Column 30, Line number 46:
"provides a reduction of the the number of the subject's"
Should read:
-- provides a reduction of the number of the subject's --

In Claim 17:
At Column 30, Line number 48:
"The method of claim 1, wherein the administration"
Should read:
-- The method of claim 11, wherein the administration --

Signed and Sealed this
Thirteenth Day of January, 2026

John A. Squires
*Director of the United States Patent and Trademark Office*

CERTIFICATE OF CORRECTION (continued)
U.S. Pat. No. 12,466,839 B2

In Claim 32:
At Column 31, Line number 19:
"The method of claim 1, wherein the administration"
Should read:
-- The method of claim 11, wherein the administration --